United States Patent
Sridhar et al.

(10) Patent No.: US 12,002,455 B2
(45) Date of Patent: Jun. 4, 2024

(54) SEMANTICALLY-AUGMENTED CONTEXT REPRESENTATION GENERATION

(71) Applicant: QUALCOMM Incorporated, San Diego, CA (US)

(72) Inventors: Arvind Krishna Sridhar, San Diego, CA (US); Ravi Choudhary, San Diego, CA (US); Lae-Hoon Kim, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/383,284

(22) Filed: Jul. 22, 2021

(65) Prior Publication Data

US 2023/0034450 A1 Feb. 2, 2023

(51) Int. Cl.
| | |
|---|---|
| *G10L 15/16* | (2006.01) |
| *G06V 30/262* | (2022.01) |
| *G10L 15/18* | (2013.01) |
| *G10L 15/22* | (2006.01) |
| *G06N 3/0455* | (2023.01) |
| *G10L 15/183* | (2013.01) |

(52) U.S. Cl.
CPC ........ *G10L 15/1815* (2013.01); *G06V 30/274* (2022.01); *G10L 15/1822* (2013.01); *G10L 15/22* (2013.01); *G06N 3/0455* (2023.01); *G10L 15/16* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 6,611,755 B1 | 8/2003 | Coffee et al. | |
| 8,140,569 B2 * | 3/2012 | Hulten | G06Q 30/00 707/770 |

(Continued)

FOREIGN PATENT DOCUMENTS

| | | |
|---|---|---|
| WO | 2014000280 A1 | 1/2014 |
| WO | 2018085728 A1 | 5/2018 |

OTHER PUBLICATIONS

Lan et al., "Albert: A Lite BERT for Self-Supervised Learning of Language Representations", Google Research and Toyota Technological Institute at Chicago, Published as a conference paper at ICLR 2020, Feb. 9, 2020, pp. 1-17.

(Continued)

*Primary Examiner* — Richard Z Zhu
(74) *Attorney, Agent, or Firm* — QUALCOMM Incorporated; Espartaco Diaz Hidalgo

(57) ABSTRACT

A device includes a memory configured to store instructions. The device also includes one or more processors configured to execute the instructions to provide context and one or more items of interest corresponding to the context to a dependency network encoder to generate a semantic-based representation of the context. The one or more processors are also configured to provide the context to a data dependent encoder to generate a context-based representation. The one or more processors are further configured to combine the semantic-based representation and the context-based representation to generate a semantically-augmented representation of the context.

30 Claims, 16 Drawing Sheets

(56) References Cited

U.S. PATENT DOCUMENTS

| | | | | |
|---|---|---|---|---|
| 10,380,259 | B2* | 8/2019 | Lee | G06N 5/022 |
| 10,515,625 | B1* | 12/2019 | Metallinou | G10L 15/1822 |
| 11,042,796 | B2* | 6/2021 | Hashimoto | G06N 3/045 |
| 11,087,864 | B2* | 8/2021 | Xie | H04L 67/104 |
| 11,423,883 | B2* | 8/2022 | Prabhavalkar | G10L 15/22 |
| 11,580,968 | B1* | 2/2023 | Gupta | G10L 15/22 |
| 11,676,571 | B2* | 6/2023 | Byun | G10L 13/033 704/259 |
| 11,868,730 | B2* | 1/2024 | Hou | G06F 40/279 |
| 2006/0112190 | A1 | 5/2006 | Hulten et al. | |
| 2015/0118658 | A1 | 4/2015 | Mayou et al. | |
| 2017/0083622 | A1 | 3/2017 | Blanco | |
| 2018/0121799 | A1* | 5/2018 | Hashimoto | G06N 3/08 |
| 2018/0357073 | A1 | 12/2018 | Johnson et al. | |
| 2019/0115045 | A1 | 4/2019 | Jarvis et al. | |
| 2019/0213480 | A1 | 7/2019 | Lim et al. | |
| 2020/0357387 | A1* | 11/2020 | Prabhavalkar | G06N 3/045 |
| 2021/0011887 | A1 | 1/2021 | Visser et al. | |
| 2022/0277143 | A1* | 9/2022 | Jayarao | G06F 40/30 |

OTHER PUBLICATIONS

Klein et al., "Learning to Answer by Learning to Ask: Getting the Best of GPT-2 and BERT Worlds", SAP Machine Learning Research, Berlin, Germany, Nov. 6, 2019, pp. 1-10.

Mohammadshahi et al., "Graph-to-Graph Transformer for Transition-based Dependency Parsing", Findings of the Association for Computational Linguistics: EMNLP 2020, c 2020 Association for Computational Linguistics, Nov. 16-20, 2020, pp. 3278-3289.

BERT Explained: State of the art language model for NLP, Nov. 17, 2018, towardsdatascience.com/bert-explained-state-of-the-art-language-model-for-nlp-f8b21a9b6270, pp. 1-9.

Jay Alammar, "The Illustrated BERT, ELMo, and co. (How NLP Cracked Transfer Learning)", Visualizing Machine Learning One Concept at a Time. The Illustrated Transformer [Blog post]. https://jalammar.github.io/illustrated-transformer/, Dec. 3, 2018, printed May 24, 2021, pp. 1-20.

Jay Alammar, "The Illustrated GPT-2 (Visualizing Transformer Language Models)", Visualizing Machine Learning One Concept at a Time. The Illustrated Transformer [Blog post]. https://jalammar.github.io/illustrated-gpt2/, Aug. 12, 2019, printed May 24, 2021, pp. 1-43.

Jay Alammar, "The Illustrated Transformer", Visualizing Machine Learning One Concept at a Time. The Illustrated Transformer [Blog post]. https://jalammar.github.io/illustrated-transformer/, Jun. 27, 2018, printed May 24, 2021, pp. 1-23.

Miguel Romero Calvo, "Dissecting BERT Part 1: The Encoder", Medium, Nov. 26, 2018, https://medium.com/dissecting-bert/dissecting-bert-part-1-d3c3d495cdb3. Printed May 25, 2021, pp. 1-22.

Francisco Ingham, "Understanding BERT Part 2: BERT Specifics", Medium, Nov. 26, 2018, https://medium.com/dissecting-bert/dissecting-bert-part2-335ff2ed9c73. Printed May 25, 2021, pp. 1-16.

Miguel Romero Calvo, "Dissecting BERT Appendix: The Decoder", Medium, Nov. 26, 2018, https://medium.com/dissecting-bert/dissecting-bert-appendix-the-decoder-3b86f66b0e5f. Printed May 25, 2021, pp. 1-18.

Chan W., et al., "Listen, Attend and Spell", Aug. 20, 2015, pp. 1-16.

Devlin J., et al., "BERT: Pre-training of Deep Bidirectional Transformers for Language Understanding", Oct. 11, 2018, pp. 1-14.

Seo M., et al., "Bi-Directional Attention Flow for Machine Comprehension", ICLR 2017, pp. 1-12.

Sukhbaatar S., et al., "End-To-End Memory Networks", 2015, pp. 1-9.

International Search Report and Written Opinion—PCT/US2022/073930—ISA/EPO—dated Oct. 6, 2022.

* cited by examiner

| Context 135 | Questions 247 | Answers 253 |
|---|---|---|
| At 4 pm Erik wanted to increase the temperature in garage | Who wanted to increase the temperature in garage? | Erik |
| | What was the name of the person who wanted to increase the temperature of the garage? | Erik |
| At 5 pm Laehoon was opening the shelf in kitchen | Who opened the shelf at 5 pm? | Laehoon |
| At 10 pm Ravi wanted to turn on the Air Conditioner in bedroom | What room did Ravi want to turn on the air conditioner in? | bedroom |
| | Which appliance did Ravi want to turn on in the bedroom? | the Air Conditioner |
| At 5 pm Laehoon was breading in kitchen. | Who was cooking in the kitchen at 5pm? | Laehoon |
| At 7 pm Erik wanted to turn on the Air Conditioner in garage. | What did Erik turn on at 7 pm? | the Air Conditioner in garage |
| At 3 am Laehoon wanted to add 'potatoes' to the grocery list in kitchen. | Where did Laehoon want to add potatoes to his kitchen? | grocery list |
| At 1 pm Manyu wanted to turn off the dryer in bathroom. | What did Manyu want to turn off in the toilet? | dryer |
| At 1 am Sunkuk wanted to decrease the brightness in bedroom. | What did Sunkuk want to decrease? | the brightness in bedroom |
| At 2 pm Laehoon wanted to pause the music in kitchen. | Which Korean singer wanted to pause the music in the kitchen? | Laehoon |

FIG. 2

SEMANTICALLY-AUGMENTED CONTEXT REPRESENTATION GENERATION

I. FIELD

The present disclosure is generally related to generation of a representation of a context.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive sensor data, such as an audio signal from one or more microphones, image data from one or more cameras, or a combination thereof. For example, the audio signal may represent user speech captured by the microphones, and the image data may represent user images. The sensor data can be used to determine contextual information about a user. The availability of large amounts of user contextual information provides data mining opportunities.

III. SUMMARY

According to one implementation of the present disclosure, a device includes a memory configured to store instructions. The device also includes one or more processors configured to execute the instructions to provide context and one or more items of interest corresponding to the context to a dependency network encoder to generate a semantic-based representation of the context. The one or more processors are also configured to provide the context to a data dependent encoder to generate a context-based representation. The one or more processors are further configured to combine the semantic-based representation and the context-based representation to generate a semantically-augmented representation of the context. According to another implementation of the present disclosure, a method includes providing, at a device, context and one or more items of interest corresponding to the context to a dependency network encoder to generate a semantic-based representation of the context. The method also includes providing, at the device, the context to a data dependent encoder to generate a context-based representation. The method further includes combining, at the device, the semantic-based representation and the context-based representation to generate a semantically-augmented representation of the context.

According to another implementation of the present disclosure, a non-transitory computer-readable medium stores instructions that, when executed by one or more processors, cause the one or more processors to provide context and one or more items of interest corresponding to the context to a dependency network encoder to generate a semantic-based representation of the context. The instructions, when executed by the one or more processors also cause the one or more processors to provide the context to a data dependent encoder to generate a context-based representation. The instructions, when executed by the one or more processors further cause the one or more processors to combine the semantic-based representation and the context-based representation to generate a semantically-augmented representation of the context.

According to another implementation of the present disclosure, an apparatus includes means for providing context and one or more items of interest corresponding to the context to a dependency network encoder to generate a semantic-based representation of the context. The apparatus also includes means for providing the context to a data dependent encoder to generate a context-based representation. The apparatus further includes means for combining the semantic-based representation and the context-based representation to generate a semantically-augmented representation of the context.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 2 is a table of illustrative examples of context, items of interest, and related items of the system of FIG. 1, in accordance with some examples of the present disclosure.

V. DETAILED DESCRIPTION

Users are surrounded by sensors (e.g., a camera, a microphone, a mobile device location sensor, etc.) that generate sensor data indicating user contextual information. The contextual information can be mined to extract useful data.

Systems and methods of generating a semantically-augmented context representation are disclosed. A context representation generator generates a context (e.g., "Erik is in the kitchen at 2 AM") based on sensor data. A data-dependent encoder generates a context-based representation that is based on the context. For example, the context-based representation maps every word in the context to every other word in the context. A dependency network encoder generates a semantic-based representation based on the context and an item of interest (e.g., a question, such as "who was in the kitchen at 2 AM?") related to the context. The semantic-based representation accounts for the linguistic nature of the context. For example, the semantic-based representation is based on a dependency parsing graph of the context. The context representation generator generates a semantically-augmented representation of the context by combining the semantic-based representation and the context-based representation. The semantically-augmented representation of the context has advantages of both the context-based representation (e.g., rich connections) and the semantic-based representation (e.g., linguistic connections).

A related item generator processes the semantically-augmented representation to generate a related item (e.g., an answer, such as "Erik") corresponding to the item of interest (e.g., the question). The item of interest including a question and the related item including an answer is provided as an illustrative example. In another example, the item of interest can include an answer and the related item can include a question. In yet another example, the item of interest can include a keyword and the related item can include text related to the keyword.

In a particular example, the item of interest and the related item are provided to the user via a display device. In another example, the question and answer can be added to a training data set to train various machine learning models (e.g., neural networks). To illustrate, a machine learning model can be trained to answer questions related to contexts associated with other users. In another example, a machine learning model can be trained as a customer service bot to handle customer inquiries.

Figure 1:
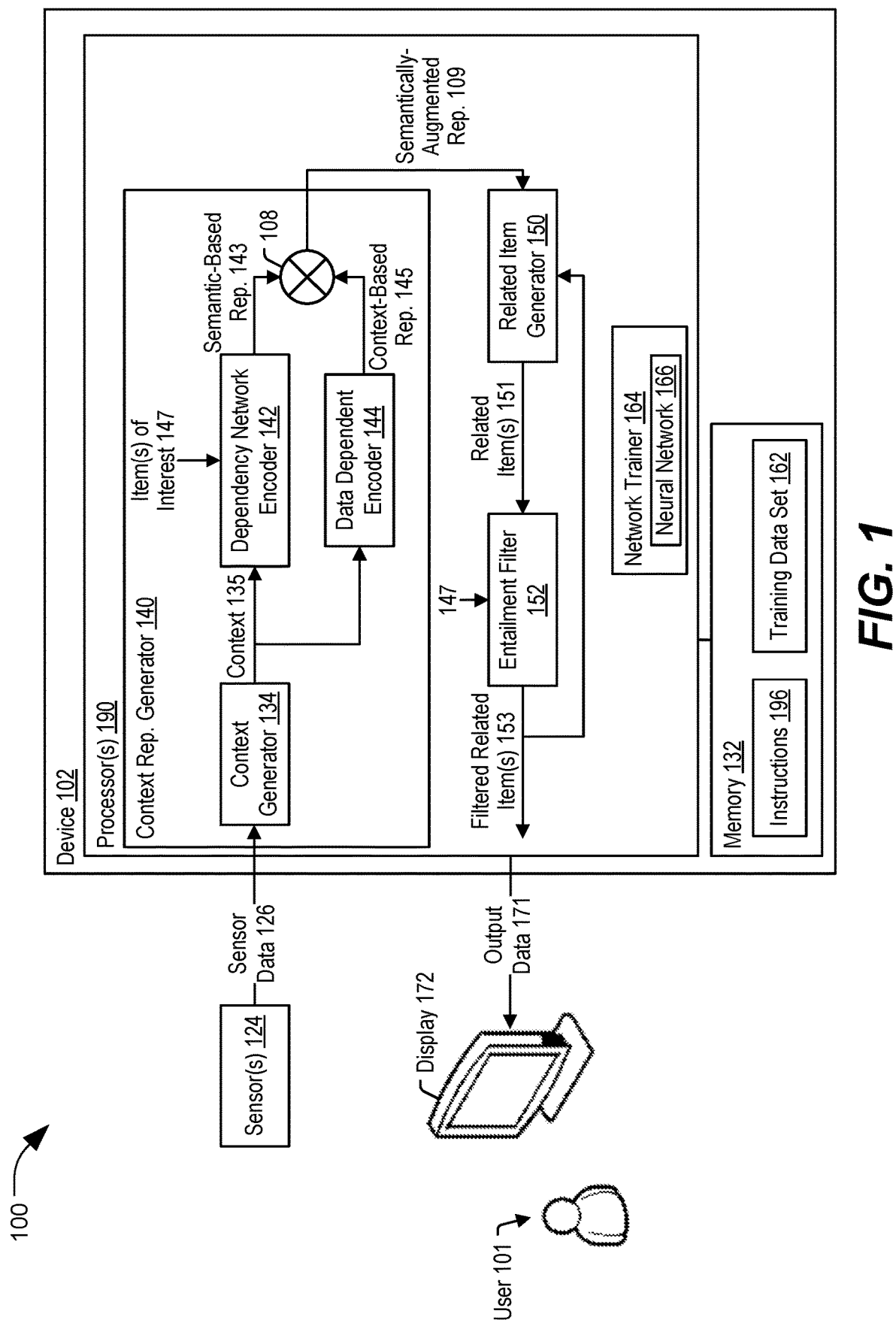
FIG. 1 is a block diagram of a particular illustrative aspect of a system operable to generate semantically-augmented context representations, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to generate semantically-augmented context representations is disclosed and generally designated 100. The system 100 includes a device 102 that is coupled to one or more sensors 124, a display device 172, or a combination thereof. The one or more sensors 124 include a camera, a microphone, a location sensor, an ambient light sensor, a proximity sensor, an accelerometer, a gyroscope, a compass, a barometer, a fingerprint sensor, a posture sensor, or a combination thereof. The device 102 is configured to generate semantically-augmented context representations using a context representation generator 140.

The device 102 includes one or more processors 190 coupled to a memory 132. In a particular aspect, the one or more processors 190 are configured to receive sensor data 126 from the one or more sensors 124. In a particular aspect, the one or more processors 190 are configured to provide output data 171 to the display device 172. In some examples, one or more of the one or more sensors 124 or the display device 172 are integrated in the device 102. In some examples, one or more of the one or more sensors 124 or the display device 172 are external to the device 102.

The one or more processors 190 includes the context representation generator 140. The context representation generator 140 is configured to process the sensor data 126 from the one or more sensors 124 to generate a semantically-augmented representation 109. In a particular example, the context representation generator 140 includes a context generator 134 coupled to a dependency network encoder 142 and to a data dependent encoder 144. Each of the dependency network encoder 142 and the data dependent encoder 144 is coupled to a combiner 108.

The context generator 134 is configured to determine a context 135 based on the sensor data 126. In a particular aspect, the context 135 corresponds to a textual description (e.g., "Erik opened the kitchen refrigerator door at 2 AM") that is based on the sensor data 126 (e.g., "Refrigerator fingerprint sensor detected Erik's fingerprint at 2 AM. Refrigerator door sensor indicated door opened at 2 AM"). The dependency network encoder 142 is configured to process the context 135 and one or more items of interest 147 to generate a semantic-based representation 143. In a particular aspect, the one or more items of interest 147 are based on user input, a configuration setting, default data, or a combination thereof. For example, a user 101 may provide user input to the device 102 indicating the one or more items of interest 147 to extract one or more related items 151, if any, from the context 135. In a particular example, the one or more items of interest 147 correspond to an answer (e.g., "Erik") for which one or more questions are to be generated based on the context 135 (e.g., "Erik opened the kitchen refrigerator door at 2 AM"). In some examples, the one or more items of interest 147 can correspond to an answer (e.g., "Joe") for which the context 135 does not indicate any related questions.

The data dependent encoder 144 is configured to process the context 135 to generate a context-based representation 145. The data dependent encoder 144 is configured to generate the context-based representation 145 independently of an indication of the one or more items of interest 147. In a particular example, the context 135 includes the one or more items of interest 147 (e.g., "Erik"). In another example, the context 135 does not include any of the one or more items of interest 147 (e.g., "Joe"). In either case, the data dependent encoder 144 processes the context 135 independently of any indication of which one or more items are of interest. The combiner 108 is configured to combine (e.g., concatenate) the semantic-based representation 143 and the context-based representation 145 to generate the semantically-augmented representation 109.

In a particular aspect, the one or more processors 190 also include a related item generator 150, an entailment filter 152, or both. The related item generator 150 is configured to process the semantically-augmented representation 109 to generate one or more related items 151. In a particular aspect, the one or more related items 151 correspond to one or more questions (e.g., "Who opened the refrigerator?", "Who was in the kitchen at 2 AM?", or "What did Erik open?"). The entailment filter 152 is configured to generate one or more filtered related items 153 by filtering the one or more related items 151. For example, the entailment filter 152 is configured to output any of the one or more related items 151 (e.g., "Who opened the refrigerator?" and "Who was in the kitchen at 2 AM?") that are a match for the one or more items of interest 147 (e.g., "Erik") as the one or more filtered related items 153 and discard any remaining ones (e.g., "What did Erik open?") of the one or more related items 151. In a particular aspect, the one or more processors 190 are configured to train (e.g., update configuration settings) the related item generator 150 based on a comparison of the one or more related items 151 and the one or more filtered related items 153.

In a particular aspect, the memory 132 is configured to store a training data set 162. For example, the one or more processors 190 are configured to add the one or more related items 151 (or the one or more filtered related items 153) and the one or more items of interest 147 to the training data set 162. In a particular aspect, the one or more processors 190 include a network trainer 164 that is configured to train a machine learning model (e.g., a neural network 166) based on the training data set 162. In a particular aspect, the one or more processors 190 are configured to generate the output data 171 based on the one or more related items 151 (or the one or more filtered related items 153) and provide the output data 171 to the display device 172. For example, the output data 171 indicates the one or more items of interest 147, the one or more related items 151 (or the one or more filtered related items 153), or a combination thereof.

The memory 132 is configured to store instructions 196 that are executable by the one or more processors 190 to implement the functionality described with reference to the context generator 134, the dependency network encoder 142, the data dependent encoder 144, the combiner 108, the context representation generator 140, the related item generator 150, the entailment filter 152, the network trainer 164, the one or more processors 190, or a combination thereof.

In some implementations, the device 102 corresponds to or is included in various types of devices. In an illustrative example, the one or more processors 190 are integrated in a headset device, such as described further with reference to FIG. 13. In other examples, the one or more processors 190 are integrated in at least one of a mobile phone or a tablet computer device, as described with reference to FIG. 12, a wearable electronic device, as described with reference to FIG. 14, a voice-controlled speaker system, as described with reference to FIG. 15, a camera device, as described with reference to FIG. 16, or a virtual reality, mixed reality, or augmented reality headset, as described with reference to FIG. 17. In another illustrative example, the one or more processors 190 are integrated into a vehicle, such as described further with reference to FIG. 18 and FIG. 19.

During operation, the context representation generator 140 receives the sensor data 126 from the one or more sensors 124. For example, the sensor data 126 includes image data from a camera (e.g., an image captured at 4 PM"), audio data from a microphone (e.g., speech captured at 4 PM), location data from a location sensor (e.g., indicating that the camera, microphone, or both, are in the living room at 4 PM), or another type of sensor data.

The context generator 134 generates a context 135 (e.g., "At 4 PM Ravi was feeling irritated in the living room") based on the sensor data 126. For example, the context generator 134 performs person recognition, activity recognition, emotion recognition, object recognition, location recognition, or other analysis on the sensor data 126 to generate the context 135. In a particular example, the sensor data 126 includes image data from a camera, and the context generator 134 generates the context 135 based at least in part on performing, on the image data, object recognition, emotion recognition, location recognition, person recognition, or a combination thereof. In a particular example, the sensor data 126 includes audio data from a microphone, and the context generator 134 generates the context 135 based at least in part on performing, on the audio data, speech recognition, emotion recognition, location recognition, speaker recognition, or a combination thereof.

In an illustrative example, the context generator 134 performs image recognition on image data of the sensor data 126 to determine that the image data represents an image of a person (e.g., Ravi). In a particular example, the context generator 134 performs speech analysis on audio data of the sensor data 126 to determine that the audio data represents speech of a person (e.g., Ravi). In a particular aspect, the context generator 134 performs emotion recognition to determine that the image of the person (e.g., Ravi), the speech of the person, or both, indicate that the person has a particular emotion (e.g., "irritated"). In a particular aspect, the context generator 134 determines a location (e.g., living room) based on location data of the sensor data 126. In a particular aspect, the context generator 134 determines a location (e.g., living room) by analyzing the image data, the audio data, or both. In a particular aspect, the context generator 134 determines a time (or a time range) based on a timestamp associated with the sensor data. In a particular aspect, the context generator 134 determines an activity (e.g., "in a meeting") based on image analysis, audio analysis, user calendar information, or a combination thereof. In a particular aspect, the context generator 134 generates the context 135 based on the person, the particular emotion, the activity, the location, the time, or a combination thereof. For example, the context generator 134 generates the context 135 indicating that the person (e.g., Ravi) was feeling the particular emotion (e.g., "irritated") while performing the activity (e.g., "in a meeting") at the location (e.g., "living room") at the time (e.g., "4 PM").

Generating the context 135 based on the sensor data 126 is provided as an illustrative example. The context generator 134 can generate the context 135 based on various types of data, such as documents, books, websites, journals, articles, user browser activity, user account activity, user purchase activity, factory activity, computer activity, gaming activity, network activity, or warehouse activity, as illustrative non-limiting examples.

The context generator 134 provides the context 135 (e.g., "At 4 PM Ravi was feeling irritated in the living room") to the data dependent encoder 144 (e.g., a bidirectional encoder representations from transformers (BERT) transformer) to generate the context-based representation 145. For example, the data dependent encoder 144 encodes the context 135 to generate the context-based representation 145, as further described with reference to FIGS. 6-7. In a particular context, the context-based representation 145 corresponds to an embedding representation of the context 135. In a particular aspect, the context-based representation 145 maps each word of the context 135 to every other word of the context 135. In a particular aspect, the context generator 134 stores the context-based representation 145 in the memory 132, provides the context-based representation 145 to the combiner 108, or both.

The context representation generator 140 provides one or more items of interest 147 and the context 135 to the dependency network encoder 142 to generate a semantic-based representation 143. For example, the context generator 134 provides the context 135 (e.g., "At 4 PM Ravi was feeling irritated in the living room") to the dependency network encoder 142. In a particular aspect, the one or more items of interest 147 are based on default data, a configuration setting, user input received from a user 101, or a combination thereof. In a particular aspect, the one or more items of interest 147 correspond to an answer (e.g., "Ravi was feeling irritated") for which one or more predicted questions are to be extracted from the context 135. In another aspect, the one or more items of interest 147 correspond to a question (e.g., "How was Ravi feeling?") for which one or more predicted answers are to be extracted from the context 135. In a particular aspect, the one or more items of interest 147 correspond to keywords for which one or more predicted text is to be extracted from the context 135.

The dependency network encoder 142 encodes the context 135 and the one or more items of interest 147 to generate the semantic-based representation 143, as further described with reference to FIG. 4. For example, the dependency network encoder 142 includes a dependency parser that generates a dependency parsing graph of the context 135. The dependency network encoder 142 includes an encoder that generates the semantic-based representation 143 based on the one or more items of interest 147 and the dependency parsing graph. For example, the encoder encodes the one or more items of interest 147 and the dependency parsing graph to generate the semantic-based representation 143. Generating the semantic-based representation 143 based on the dependency parsing graph is provided as an illustrative example. In some examples, the dependency network encoder 142 generates the semantic-based representation 143 based on another representation of the semantic relations between words of the context 135.

The combiner 108 combines (e.g., concatenates) the semantic-based representation 143 and the context-based representation 145 to generate the semantically-augmented representation 109. In a particular aspect, the context representation generator 140 stores the semantically-augmented representation 109 to the memory 132. For example, the context representation generator 140 adds the semantically-augmented representation 109 to a set of semantically-augmented context representations. In a particular aspect, the context representation generator 140 provides the semantically-augmented representation 109 (e.g., the set of semantically-augmented context representations) to the related item generator 150 to generate one or more related items 151.

In a particular aspect, the related item generator 150 includes a generative pretrained transformer (GPT) decoder, another type of generative decoder, a question generation model, a question answer (QA) model (e.g., Albert QA model), a transformer model, or a combination thereof. In a particular example, the related item generator 150 (e.g., a generative decoder) decodes the semantically-augmented representation 109 (e.g., representing the one or more items of interest 147 and the context 135) to generate one or more related items 151, as further described with reference to FIG. 9. In a particular aspect, the related item generator 150 (e.g., Albert QA model) extracts the one or more related items 151 from the semantically-augmented representation 109, as described with reference to FIG. 10.

In a particular aspect, the one or more items of interest 147 correspond to an answer (e.g., "Ravi was feeling irritated") and the context representation generator 140 provides the semantically-augmented representation 109 to the related item generator 150 to generate one or more predicted questions for the answer. For example, the related item generator 150 generates the one or more related items 151 (e.g., "How was Ravi feeling?", "Who was feeling irritated?", "What was Ravi doing in the living room at 4 PM?") as questions predicted to correspond to the answer indicated by the one or more items of interest 147. In an alternative aspect, the one or more items of interest 147 correspond to a question (e.g., "How was Ravi feeling?") and the context representation generator 140 provides the semantically-augmented representation 109 to the related item generator 150 to generate one or more predicted answers for the question. For example, the related item generator 150 generates the one or more related items 151 (e.g., "Ravi was feeling irritated?", "Ravi was feeling irritated at 4 PM in the living room") as answers predicted to correspond to the question indicated by the one or more items of interest 147.

In a particular aspect, the one or more items of interest 147 correspond to one or more keywords (e.g., "feeling") and the context representation generator 140 provides the semantically-augmented representation 109 to the related item generator 150 to generate one or more predicted texts. For example, the related item generator 150 generates the one or more related items 151 (e.g., "Ravi was feeling irritated", "Who was feeling irritated in the living room?") as text predicted to correspond to the one or more keywords indicated by the one or more items of interest 147.

In a particular aspect, the related item generator 150 provides the one or more related items 151 to the entailment filter 152 to generate one or more filtered related items 153. In a particular aspect, the entailment filter 152 includes a BERT based entailment filter or another type of entailment filter. In a particular aspect, the entailment filter 152 filters the one or more related items 151 based on the one or more items of interest 147. For example, the entailment filter 152 outputs the one or more related items 151 (e.g., "What was Ravi doing at 4 PM?") that match the one or more items of interest 147 (e.g., "Ravi was feeling irritated") as the one or more filtered related items 153 and discards the remaining ones (e.g., "Where was Ravi at 4 PM?") of the one or more related items 151. In a particular aspect, the entailment filter 152 determines that a particular related item of the one or more related items 151 matches the one or more items of interest 147 based on determining that the particular related item has a greater than threshold probability of being relevant to the one or more items of interest 147.

In a particular aspect, the one or more processors 190 train the related item generator 150 based on a comparison of the one or more related items 151 and the one or more filtered related items 153. For example, the one or more processors 190 determine a model loss based on a comparison of the one or more related items 151 and the one or more filtered related items 153, and updates a configuration setting (e.g., weights, biases, or both) of the related item generator 150 based on the model loss. In some implementations, the one or more processors 190 do not include the entailment filter 152.

In a particular aspect, the one or more processors 190 generate the output data 171 based on the one or more items of interest 147, the one or more filtered related items 153, the one or more related items 151, or a combination thereof, and provide the output data 171 to the display device 172. For example, the user 101 provides user input indicating the one or more items of interest 147 and the output data 171 indicates the one or more filtered related items 153 or the one or more related items 151 predicted to be related to the one or more items of interest 147. As an illustrative example, the one or more items of interest 147 include an answer, a question, or a keyword, and the one or more related items 151 (or the one or more filtered related items 153) include a predicted question for the answer, a predicted answer to the question, or predicted text related to the keywords, respectively.

In a particular aspect, the one or more processors 190 add the one or more items of interest 147, the one or more filtered related items 153, the one or more related items 151, or a combination thereof, to a training data set 162 stored in the memory 132. For example, the network trainer 164 trains a machine learning model (e.g., the neural network 166) based on the training data set 162. In a particular aspect, the neural network 166 includes a question answer network.

The system 100 thus enables processing of large amounts of context information in real time (e.g., as the sensor data is being received from the sensors) to automatically predict (e.g., extract) related items corresponding to items of interest. Although the context representation generator 140 and the related item generator 150 are illustrated as integrated in a single device 102, in other implementations the context representation generator 140 and the related item generator 150 may be included in separate devices. For example, the related item generator 150 of a second device (e.g., a server) may receive a plurality of semantically-augmented representations 109 from multiple devices 102 (e.g., user devices). In this example, the related item generator 150 receives a plurality of semantically-augmented representations 109 from the multiple devices 102, and generates aggregated related items corresponding to the semantically-augmented representations 109.

As an illustrative example, multiple devices 102 (e.g., a nationwide fleet of delivery vehicles) generate semantically-augmented representations 109 corresponding to one or more items of interest 147 (e.g., "Who's driving above 60 miles per hour?"). The related item generator 150 (e.g., at a server) receives a first semantically-augmented representation 109 from a first device 102 (e.g., at a first delivery vehicle), a second semantically-augmented representation 109 from a second device 102 (e.g., at a second delivery vehicle), and a third semantically-augmented representation 109 from a third device 102 (e.g., at a third delivery vehicle). The first semantically-augmented representation 109 corresponds to a first context 135 that is based on first sensor data 126 (e.g., speed data, image data, etc.) of the first device 102 (e.g., the first delivery vehicle). Similarly, the second semantically-augmented representation 109 and the third semantically-augmented representation 109 correspond to a second context 135 of the second device 102 and to a third context 135 of the third device 102, respectively.

The related item generator 150 generates the one or more related items 151 for the semantically-augmented representations 109. For example, the related item generator 150 generates first related items 151 (e.g., "Bob is driving 70 miles per hour") based on the first semantically-augmented representation 109, generates second related items 151 (e.g., "Ahmed is driving below 60 miles per hour") based on the second semantically-augmented representation 109, and generates third related items 151 (e.g., "Kai is driving 65 miles per hour") based on the third semantically-augmented representation 109. In a particular aspect, the entailment filter 152 generates the one or more filtered related items 153 (e.g., "Bob is driving 70 miles per hour and Kai is driving 65 miles per hour") based on the one or more items of interest 147 (e.g., "Who's driving above 60 miles per hour?") and the first related items 151, the second related items 151, the third related items 151, or a combination thereof. In a particular aspect, the entailment filter 152 (e.g., at the server) generates the output data 171 indicating the one or more filtered related items 153 and provides the output data 171 to a user device (e.g., as an alert to a mobile device of a delivery manager), the display device 172, or both.

Referring to FIG. 2, a table 200 of examples of the context 135, questions 247, and answers 253 is shown. In a particular aspect, the context generator 134 of FIG. 1 generates the context 135 and the related item generator 150 generates the questions 247 or the answers 253.

In a particular implementation, the questions 247 correspond to one or more items of interest 147 and the answers 253 correspond to the one or more related items 151 (or the one or more filtered related items 153). For example, the one or more related items 151 indicate one or more of the answers 253 (e.g., "Erik") as at least one predicted answer to one of the questions 247 (e.g., "Who wanted to increase the temperature in garage?") indicated by the one or more items of interest 147 related to an example of the context 135 (e.g., "At 4 pm Erik wanted to increase the temperature in the garage").

In a particular implementation, the answers 253 correspond to one or more items of interest 147 and the questions 247 correspond to the one or more related items 151 (or the one or more filtered related items 153). For example, the one or more related items 151 indicate one or more of the questions 247 (e.g., "Who wanted to increase the temperature in the garage?", "What was the name of the person who wanted to increase the temperature of the garage?") as at least one predicted question for one of the answers 253 (e.g., "Erik") indicated by the one or more items of interest 147 related to an example of the context 135 (e.g., "At 4 pm Erik wanted to increase the temperature in the garage").

Figure 3:
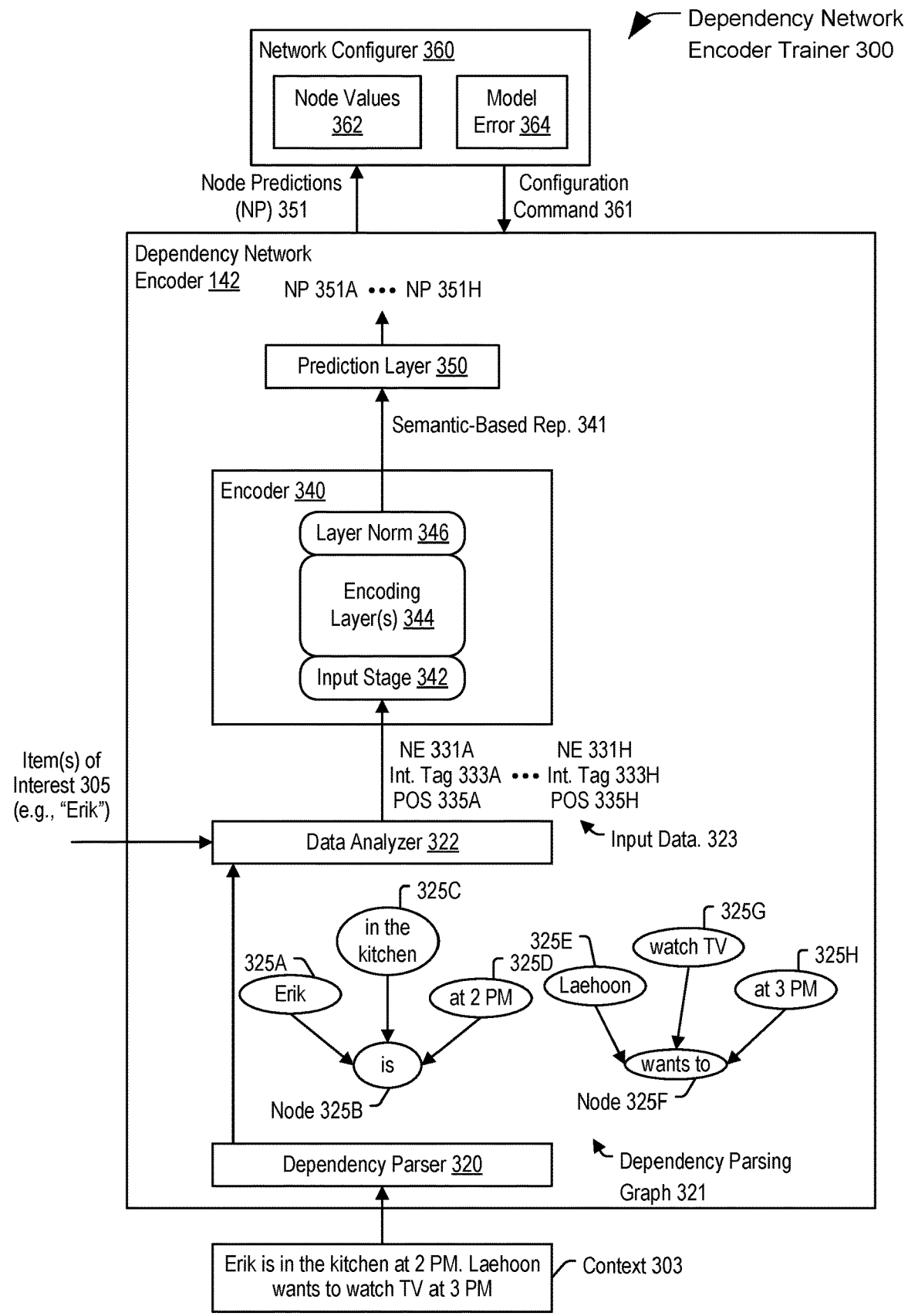
FIG. 3 is a diagram of an illustrative aspect of operations associated with a dependency network encoder trainer configure to train a dependency network encoder of the system of FIG. 1, in accordance with some examples of the present disclosure.

Referring to FIG. 3, a dependency network encoder trainer 300 is shown. The dependency network encoder trainer 300 is configured to train the dependency network encoder 142 of FIG. 1.

In a particular aspect, the context representation generator 140 of FIG. 1 and the dependency network encoder trainer 300 are integrated in the same device (e.g., the device 102). In an alternative aspect, the dependency network encoder trainer 300 is included in a second device and the device 102 receives the dependency network encoder 142 from the second device.

The dependency network encoder 142 includes the dependency network encoder 142 coupled to a network configurer 360. The dependency network encoder 142 includes a dependency parser 320 coupled via a data analyzer 322 to an encoder 340. The encoder 340 is coupled to a prediction layer 350 (e.g., a classification layer).

The dependency network encoder trainer 300 provides a context 303 (e.g., "Erik is in the kitchen at 2 AM. Laehoon wants to watch TV at 3 PM") as a training context and one or more items of interest 305 (e.g., "Erik") as training items of interest to the dependency network encoder 142. The dependency parser 320 processes the context 303 (e.g., "Erik is in the kitchen at 2 AM. Laehoon wants to watch TV at 3 PM") to generate a dependency parsing graph 321. In a particular aspect, the dependency parsing graph 321 indicates semantic relationships between words or phrases of the context 303. For example, nodes 325 of the dependency parsing graph 321 correspond to words of the context 303. To illustrate, the dependency parsing graph 321 includes a node 325A, a node 325B, a node 325C, and a node 325D corresponding to a word (e.g., "Erik"), a word (e.g., "is"), a phrase (e.g., "in the kitchen"), and a phrase (e.g., "at 2 PM") of the context 303, respectively. As another example, the dependency parsing graph 321 includes a node 325E, a node 325F, a node 325G, and a node 325H corresponding to a word (e.g., "Laehoon"), a phrase (e.g., "wants to"), a phrase (e.g., "watch TV"), and a phrase (e.g., "at 3 PM") of the context 303, respectively.

The dependency parsing graph 321 indicates dependency between one or more of the nodes 325 based on the semantic dependency between the corresponding words or phrases. For example, the dependency parsing graph 321 indicates a dependency between the node 325B and each of the node 325A, the node 325C, and the node 325D. In the illustrated example, the dependency parsing graph 321 indicates no dependency between the nodes 325A-D and the nodes 325E-H. The dependency parsing graph 321 including 8 nodes is provided as an illustrative example. In some examples, the dependency parsing graph 321 can include fewer than 8 nodes or more than 8 nodes.

The data analyzer 322 generates input data 323 for the encoder 340 based on the dependency parsing graph 321 and the one or more items of interest 305 (e.g., "Erik"). For example, the data analyzer 322 generates node embeddings 331 based at least in part on elements of the context 303 corresponding to the nodes 325 of the dependency parsing graph 321. To illustrate, the data analyzer 322 generates a node embedding 331A based on elements (e.g., "Erik") of the context 303 corresponding to the node 325A. As another example, the data analyzer 322 generates a node embedding 331H based on elements (e.g., "at 3 PM") of the context 303 corresponding to the node 325H.

The data analyzer 322 generates interest tags 333 corresponding to the node embeddings 331 based on the one or more items of interest 305. For example, an interest tag 333 (e.g., a bit) has a value (e.g., "0" or "1") indicating whether a corresponding node embedding 331 is associated with a node 325 that represents any of the one or more items of interest 305. To illustrate, the data analyzer 322, in response to determining that the node embedding 331A is associated with the node 325A that represents a word or phrase (e.g., "Erik") that includes (or is a synonym of) at least one of the one or more items of interest 305, generates an interest tag 333A corresponding to the node embedding 331A that has a first value (e.g., "1"). In another example, the data analyzer 322, in response to determining that the node embedding 331H is associated with the node 325H that represents a word or phrase (e.g., "at 3 PM") that does not include (or is not a synonym of) any of the one or more items of interest 305, generates an interest tag 333H corresponding to the node embedding 331H that has a second value (e.g., "0"). Similarly, the data analyzer 322 generates an interest tag 333 for each of the nodes 325B-G having the second value (e.g., "0").

The data analyzer 322 generates part of speech data 335 corresponding to the node embeddings 331. For example, the part of speech data 335 of a node embedding 331 has a value indicating a part of speech of one or more words of a node 325 associated with the node embedding 331. To illustrate, the data analyzer 322 generates part of speech data 335A corresponding to the node embedding 331A. The part of speech data 335A indicates the part of speech (e.g., "Proper Noun") of the word or phrase (e.g., "Erik") represented by the node 325A that is associated with the node embedding 331A. As another example, the data analyzer 322 generates part of speech data 335H corresponding to the node embedding 331H. The part of speech data 335H indicates the part of speech (e.g., "Preposition; Noun") of the word or phrase (e.g., "at 3 PM") represented by the node 325H that is associated with the node embedding 331H. The data analyzer 322 generates the input data 323 based on the node embeddings 331, the interest tags 333, the part of speech data 335, or a combination thereof.

Generating the input data 323 based on the dependency parsing graph 321 is provided as an illustrative example. In some examples, the dependency parser 320 generates another representation of the semantic relationships of the context 303 and the data analyzer 322 generates the input data 323 based on the other representation and the one or more items of interest 305.

The data analyzer 322 provides the input data 323 (e.g., as an input embedding) to the encoder 340. In a particular aspect, the encoder 340 includes an input stage 342 coupled via one or more encoding layers 344 to a layer norm 346 (e.g., a normalization layer). In some implementations, the encoder 340 is configured and operates as described with reference to an encoder 800 depicted in FIG. 8.

Figure 8:
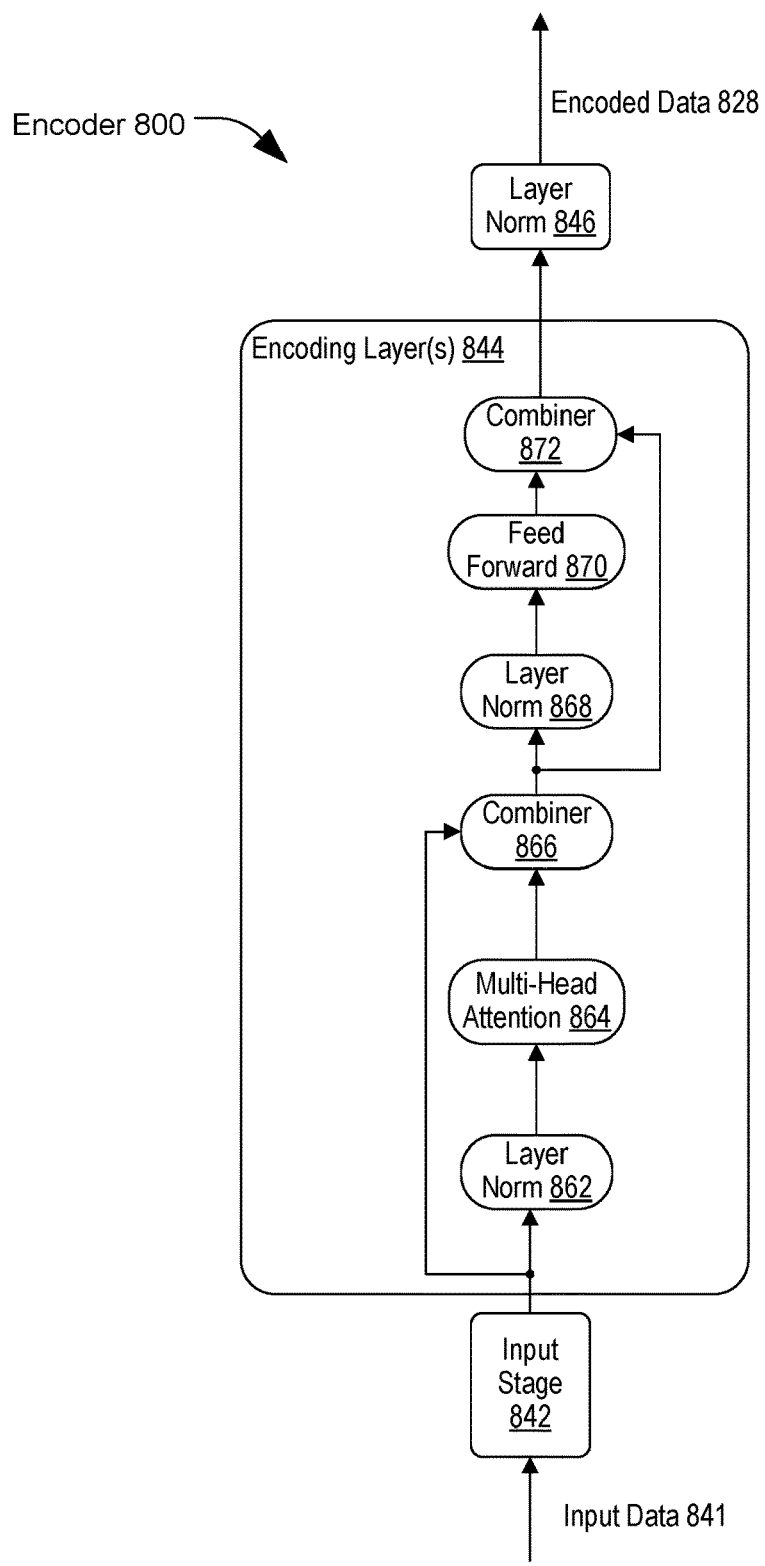
FIG. 8 is a diagram of an illustrative aspect of operations of an encoder of the system of FIG. 1, in accordance with some examples of the present disclosure.

Referring briefly to FIG. 8, the encoder 800 includes an input stage 842, one or more encoding layers 844, and a layer norm 846. Each encoding layer of the one or more encoding layers 844 includes an attention layer and a feed forward layer. The attention layer includes an attention network, such as a multi-head attention 864. The feed forward layer includes a feed forward neural network, such as a feed forward 870 (e.g., a fully connected feed forward neural network). In a particular example, the attention layer includes a layer norm 862 coupled via the multi-head attention 864 to a combiner 866. The feed forward layer includes a layer norm 868 coupled via the feed forward 870 to a combiner 872. The attention layer is coupled to the feed forward layer. For example, the combiner 866 is coupled to the layer norm 868 and to the combiner 872.

The one or more encoding layers 844 including a single encoding layer is provided as an illustrative example. In other examples, the one or more encoding layers 844 include multiple encoding layers with an output of the input stage 842 coupled to the attention layer (e.g., the layer norm 862) of an initial encoding layer, the feed forward layer (e.g., the combiner 872) of each previous encoding layer coupled to the attention layer (e.g., the layer norm 862) of a subsequent encoding layer, and the feed forward layer (e.g., the combiner 872) of a last encoding layer coupled to the layer norm 846.

The input stage 842 receives input data 841. In a particular implementation, the input stage 842 includes an encoder pre-net (e.g., a convolutional neural network (CNN), a linear projection layer, or both) that processes the input data 841 to generate an output. In a particular aspect, the output of the input stage 842 corresponds to an input embedding.

In a particular example, the encoder 800 corresponds to the encoder 340 of FIG. 3. For example, the input data 841 corresponds to the input data 323, the input stage 842 corresponds to the input stage 342, the one or more encoding layers 844 correspond to the one or more encoding layers 344, and the layer norm 846 corresponds to the layer norm 346. In a particular aspect, the output of the input stage 842 corresponds to an input embedding that is based on the input data 323 (e.g., the node embeddings 331, the interest tags 333, the part of speech data 335, or a combination thereof). In a particular aspect, an input of the attention layer (e.g., the layer norm 862) of the initial encoding layer of the one or more encoding layers 844 is based on the input embedding provided by the input stage 842. In a particular aspect, the semantic-based representation 341 is based on an output of the attention layer (e.g., the layer norm 862) of the initial encoding layer.

The output of the input stage 842 is provided, subsequent to normalization by the layer norm 862, to the multi-head attention 864. The multi-head attention 864 can build a vector from different aspects using different attention heads. For example, the multi-head attention 864 includes attention heads that process the input to the multi-head attention 864 in parallel. To illustrate, the input is multiplied by a first matrix, a second matrix, and a third matrix to generate a first Query vector, a first Key vector, and a first Value vector, respectively. The first Query vector, the first Key vector, and the first Value vector are processed by a first attention head. The input is multiplied by a fourth matrix, a fifth matrix, and a sixth matrix to generate a second Query vector, a second Key vector, and a second Value vector, respectively. The second Query vector, the second Key vector, and the second Value vector are processed by a second attention head in parallel or concurrently with the first attention head processing the first Query vector, the first Key vector, and the first Value vector.

In a particular aspect, an output of an attention head corresponds to the following Equation:

$$Z = \text{softmax}\left(\frac{QxK^T}{\sqrt{d_k}}\right)V,$$

where Z corresponds to an output of the attention head, Q corresponds to the Query vector, x corresponds to the multiplication operator, K corresponds to the Key vector, V corresponds to the Value vector, $d_k$ corresponds to the dimension of the Key vectors, and softmax corresponds to a normalization operation.

The independent outputs of the attention heads are concatenated and linearly transformed to generate an output of the multi-head attention 864. The combiner 866 generates an output by combining the input to the layer norm 862 and the output of the multi-head attention 864.

The output of the combiner 866 is provided, subsequent to normalization by the layer norm 868, to the feed forward 870 (e.g., a fully connected feed forward neural network). In a particular example, the feed forward 870 includes a first linear transformation layer coupled via a rectified linear unit (ReLU) layer to a second linear transformation layer. The feed forward 870 generates an output by processing the output of the combiner 866.

The combiner 872 generates an output by combining the output of the combiner 866 with the output of the feed forward 870. In a particular aspect, the layer norm 846 generates encoded data 828 by applying normalization to the output of the combiner 872 (e.g., of a last encoding layer of the one or more encoding layers 844). For example, applying normalization includes adjusting each value of the output (e.g., an output vector) of the combiner 872 to be within a particular range.

In a particular example, the encoder 800 corresponds to the encoder 340 of FIG. 3 and the encoded data 828 corresponds to the semantic-based representation 341. Returning to FIG. 3, the encoder 340 provides the semantic-based representation 341 to the prediction layer 350. The prediction layer 350 processes the semantic-based representation 341 to generate node predictions 351. For example, the node predictions 351 indicate whether corresponding nodes 325 of the dependency parsing graph 321 are predicted to be associated with a related item corresponding to the one or more items of interest 305. In an illustrative example, a node prediction 351A has a value (e.g., a probability value between 0 and 1) indicating whether first elements (e.g., "Erik") of the context 303 corresponding to the node 325A are predicted to be associated with a related item corresponding to the one or more items of interest 305 (e.g., "Erik"). As another example, a node prediction 351H has a value (e.g., a probability value between 0 and 1) indicating whether second elements (e.g., "at 3 PM") of the context 303 corresponding to the node 325H are predicted to be associated with a related item corresponding to the one or more items of interest 305 (e.g., "Erik").

The dependency network encoder 142 provides the node predictions 351 to the network configurer 360. During training, the network configurer 360 has access to node values 362 that indicate which of the nodes 325 are associated with elements of the context 303 (e.g., "Erik is in the kitchen at 2 AM. Laehoon wants to watch TV at 3 PM") that correspond to related items for the one or more items of interest 305 (e.g., "Erik"). For example, the node values 362 are based on user input, configuration settings, default data, or a combination thereof. In an illustrative example, the node values 362 indicate that the nodes 325A-325D are associated with elements (e.g., "Erik is in the kitchen at 2 AM") of the context 303 that correspond to related items for the one or more items of interest 305 (e.g., "Erik"), and that nodes 325E-H are associated with elements ("Laehoon wants to watch TV at 3 PM") of the context 303 that do not correspond to related items for the one or more items of interest 305 (e.g., "Erik").

The network configurer 360 generates a model error 364 based on a comparison of the node predictions 351 (e.g., generated by the prediction layer 350) and the node values 362 (e.g., predetermined values). In a particular aspect, the network configurer 360 generates a configuration command 361 based on the model error 364. For example, the configuration command 361 adjusts one or more configuration settings (e.g., weights, biases, or both) of the encoder 340. In a particular aspect, the network configurer 360 determines, based at least in part on the model error 364, that the encoder 340 has completed training and provides the dependency network encoder 142 to the context representation generator 140.

The dependency network encoder trainer 300 thus trains the dependency network encoder 142 to generate the semantic-based representation 341 that can be used to classify the nodes 325. In a particular aspect, training the dependency network encoder trainer 300 to improve the classification accuracy improves accuracy of the semantic-based representation 341 in incorporating semantic relationships between elements of the context 303 and the one or more items of interest 305.

Figure 4:
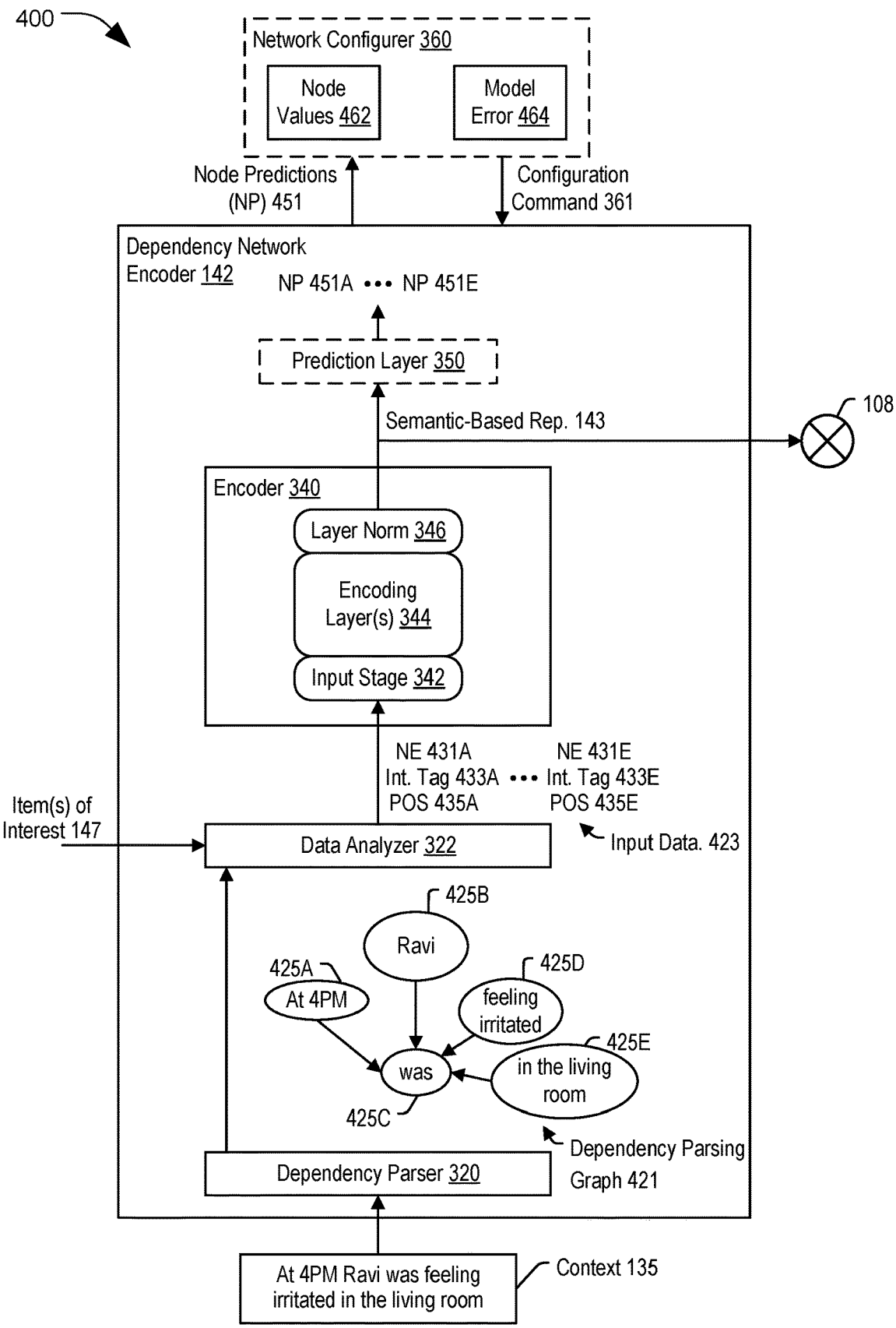
FIG. 4 is a diagram of an illustrative aspect of operations of the dependency network encoder of the system of FIG. 1, in accordance with some examples of the present disclosure.

Referring to FIG. 4, a diagram 400 of an illustrative aspect of operations of the dependency network encoder 142 is shown. In a particular implementation, the device 102 excludes the network configurer 360. For example, a trained version of the dependency network encoder 142 is provided to the device 102, and the device 102 does not include the network configurer 360 to train or update the dependency network encoder 142. In this example, the dependency network encoder 142 at the context representation generator 140 can exclude the prediction layer 350.

In a particular implementation, the device 102 includes the network configurer 360. For example, the network configurer 360 can be used to train or test the encoder 340 at the device 102. In this example, the dependency network encoder 142 at the context representation generator 140 includes the prediction layer 350.

The context representation generator 140 of FIG. 1 provides the context 135 (e.g., "At 4 PM Ravi was feeling irritated in the living room") and the one or more items of interest 147 (e.g., "How was Ravi feeling at 4 PM?") to the dependency network encoder 142. The dependency parser 320 processes context 135 (e.g., "At 4 PM Ravi was feeling irritated in the living room") to generate a dependency parsing graph 421. In a particular aspect, the dependency parsing graph 421 indicates semantic relationships between words or phrases of the context 135. For example, nodes 425 of the dependency parsing graph 421 correspond to words of the context 135. To illustrate, the dependency parsing graph 421 includes a node 425A, a node 425B, a node 425C, a node 425D, and a node 425E corresponding to a phrase (e.g., "At 4 PM"), a word (e.g., "Ravi"), a word (e.g., "was"), a phrase (e.g., "feeling irritated") and a phrase (e.g., "in the living room") of the context 135, respectively.

The dependency parsing graph 421 indicates dependency between one or more of the nodes 425 based on the semantic dependency between the corresponding words or phrases. The dependency parsing graph 421 including 5 nodes is provided as an illustrative example. In some examples, the dependency parsing graph 521 can include fewer than 5 nodes or more than 5 nodes.

The data analyzer 322 generates input data 423 for the encoder 340 based on the dependency parsing graph 421 and the one or more items of interest 147 (e.g., "How was Ravi feeling at 4 PM?"). For example, the data analyzer 322 generates node embeddings 431 based at least in part on elements of the context 135 corresponding to the nodes 425 of the dependency parsing graph 421. To illustrate, the data analyzer 322 generates a node embedding 431A based on elements (e.g., "At 4 PM") of the context 135 corresponding to the node 425A. As another example, the data analyzer 322 generates a node embedding 431E based on elements (e.g., "in the living room") of the context 135 corresponding to the node 425E.

The data analyzer 322 generates interest tags 433 corresponding to the node embeddings 431 based on the one or more items of interest 147. For example, the data analyzer 322, in response to determining that the node embedding 431A is associated with the node 425A that represents a word or phrase (e.g., "At 4 PM") that includes (or is a synonym of) at least one of the one or more items of interest 147, generates an interest tag 433A corresponding to the node embedding 431A that has a first value (e.g., "1"). In another example, the data analyzer 322, in response to determining that the node embedding 431E is associated with the node 425E that represents a word or phrase (e.g., "in the living room") that does not include (or is not a synonym of) any of the one or more items of interest 147, generates an interest tag 433E corresponding to the node embedding 431E that has a second value (e.g., "0"). Similarly, the data analyzer 322 generates an interest tag 433 for each of the nodes 425B-D.

The data analyzer 322 generates part of speech data 435 corresponding to the node embeddings 431. For example, the data analyzer 322 generates part of speech data 435A corresponding to the node embedding 431A. As another example, the data analyzer 322 generates part of speech data 435E corresponding to the node embedding 431E. The data analyzer 322 generates the input data 423 based on the node embeddings 431, the interest tags 433, the part of speech data 435, or a combination thereof.

Generating the input data 423 based on the dependency parsing graph 421 is provided as an illustrative example. In some examples, the dependency parser 320 generates another representation of the semantic relationships of the context 135 and the data analyzer 322 generates the input data 423 based on the other representation and the one or more items of interest 147.

The data analyzer 322 provides the input data 423 (e.g., as an input embedding) to the encoder 340. In a particular aspect, the encoder 340 corresponds to the encoder 800 of FIG. 8, the input data 423 corresponds to the input data 841, and the encoder 340 generates the semantic-based representation 143 corresponding to the encoded data 828, as described with reference to FIG. 8. In a particular aspect, the output of the input stage 342 corresponds to an input embedding that is based on the input data 423 (e.g., the node embeddings 431, the interest tags 433, the part of speech data 435, or a combination thereof). In a particular aspect, an input of the attention layer (e.g., the layer norm 862 of FIG. 8) of the initial encoding layer of the one or more encoding layers 344 is based on the input embedding provided by the input stage 342. In a particular aspect, the semantic-based representation 143 is based on an output of the attention layer (e.g., the layer norm 862) of the initial encoding layer.

In a particular implementation, the device 102 includes the network configurer 360 and the dependency network encoder 142 includes the prediction layer 350. During a configuration phase (e.g., training, testing, or update), the encoder 340 provides the semantic-based representation 143 to the prediction layer 350 and the prediction layer 350 generates node predictions 451. For example, the prediction layer 350 generates a node prediction 451A corresponding to the node 425A. As another example, the prediction layer 350 generates a node prediction 451E corresponding to the node 425E. The network configurer 360 determines a model error 464 based on a comparison of the node predictions 451 (e.g., predicted values) and node values 462 (e.g., predetermined values). The network configurer 360 generates a configuration command 361 based on the model error 464 to update a configuration setting (e.g., weights, biases, etc.) of the encoder 340.

The encoder 340 provides (e.g., during a use phase) the semantic-based representation 143 to the combiner 108, as described with reference to FIG. 1. The dependency network encoder 142 thus enables generating the semantic-based representation 143 that incorporates the semantic relationships between words of the one or more items of interest 147 and the context 135.

Figure 5:
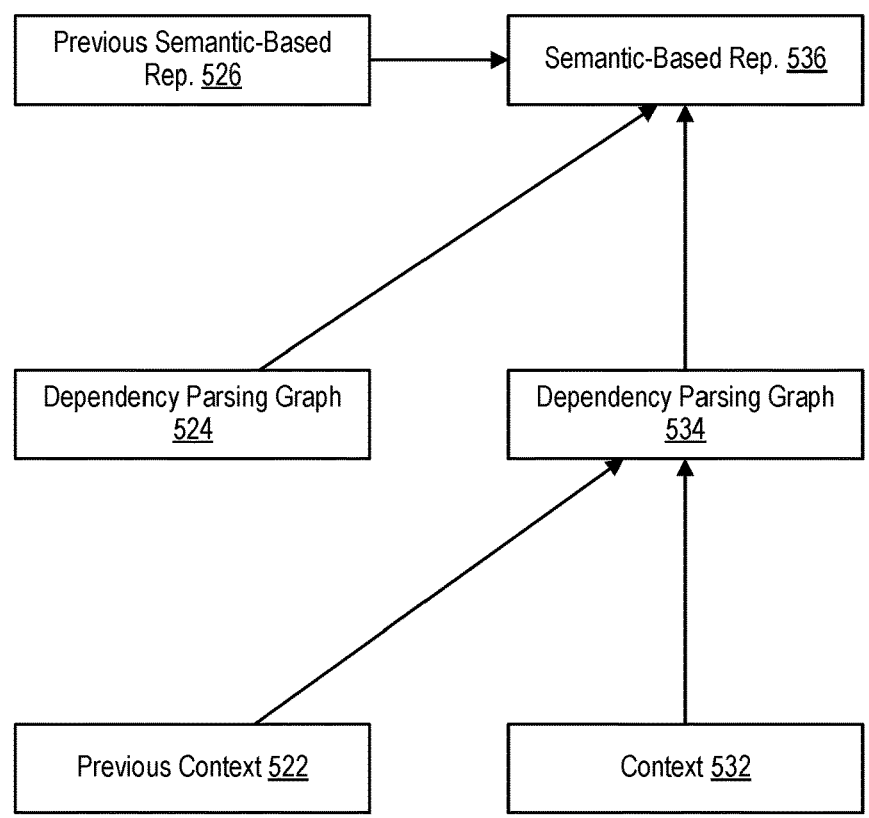
FIG. 5 is a diagram of an illustrative aspect of operations of the dependency network encoder of the system of FIG. 1, in accordance with some examples of the present disclosure.

Referring to FIG. 5, a diagram 500 of an illustrative aspect of operations of the dependency network encoder 142 is shown. In a particular aspect, the dependency network encoder 142 is configured to process a context 532 based on processing of a previous context 522.

In a particular aspect, the dependency parser 320 processes the previous context 522 to generate a dependency parsing graph 524 and a state of the dependency parser 320 is updated during processing of the previous context 522. The dependency parser 320 initiates processing of the context 532 in the updated state to generate a dependency parsing graph 534. In a particular aspect, the context 532 corresponds to the context 135 and the dependency parsing graph 534 corresponds to the dependency parsing graph 421 of FIG. 4. In another aspect, the context 532 corresponds to the context 303 and the dependency parsing graph 534 corresponds to the dependency parsing graph 321 of FIG. 3.

In a particular aspect, the encoder 340 generates a semantic-based representation 536 based on the dependency parsing graph 524 and the dependency parsing graph 534. For example, the encoder 340 processes input data (e.g., an input embedding) corresponding to the dependency parsing graph 524 to generate a previous semantic-based representation 526 and a state of the encoder 340 is updated during processing of the input data. The encoder 340 initiates processing of input data (e.g., an input embedding) corresponding to the dependency parsing graph 534 in the updated state to generate the semantic-based representation 536.

In a particular aspect, the encoder 340 generates the semantic-based representation 536 based on the previous semantic-based representation 526. For example, the input stage 342 generates input data (e.g., an input embedding) based on the input data 323 and the previous semantic-based representation 526 (e.g., feedback semantic-based representation) and provides the input data to the one or more encoding layers 344 to generate the semantic-based representation 536.

In a particular aspect, the semantic-based representation 536 corresponds to the semantic-based representation 143 of FIG. 1, the semantic-based representation 341 of FIG. 3, or both. The dependency network encoder 142 can thus generate the semantic-based representation 536 based on states corresponding to semantic relationships between the context 532 and the previous context 522.

Figure 6:
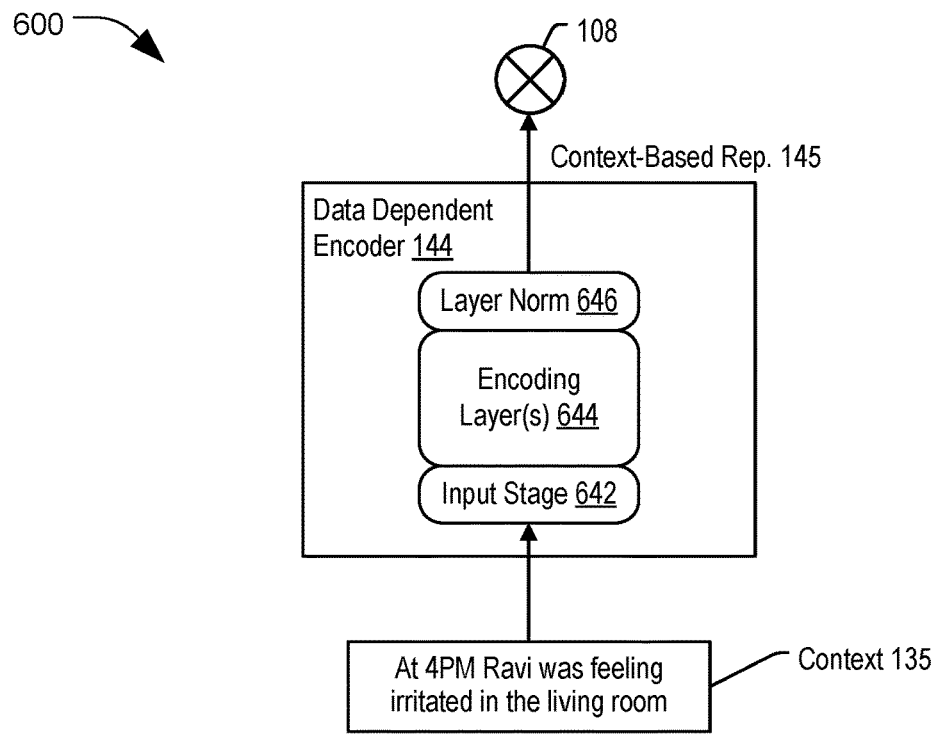
FIG. 6 is a diagram of an illustrative aspect of operations of a data dependent encoder of the system of FIG. 1, in accordance with some examples of the present disclosure.

Referring to FIG. 6, a diagram 600 of an illustrative aspect of operations of a data dependent encoder 144 is shown. The context generator 134 provides the context 135 (e.g., "At 4 PM Ravi was feeling irritated in the living room") to the data dependent encoder 144.

The data dependent encoder 144 processes the context 135 to generate the context-based representation 145. In a particular aspect, the data dependent encoder 144 includes an input stage 642 coupled via one or more encoding layers 644 to a layer norm 646 (e.g., a normalization layer). In some implementations, the data dependent encoder 144 is configured and operates as described with reference to the encoder 800 depicted in FIG. 8. For example, the context 135 corresponds to the input data 841 of FIG. 8 and the encoded data 828 corresponds to the context-based representation 145. The data dependent encoder 144 provides the context-based representation 145 to the combiner 108.

In a particular aspect, the output of the input stage 642 corresponds to an input embedding that is based on the context 135. In a particular aspect, an input of the attention layer (e.g., the layer norm 862 of FIG. 8) of the initial encoding layer of the one or more encoding layers 644 is based on the input embedding provided by the input stage 642. In a particular aspect, the context-based representation 145 is based on an output of the attention layer (e.g., the layer norm 862) of the initial encoding layer.

In a particular aspect, the one or more encoding layers 344 includes the same count or a different count of layers as the one or more encoding layers 644. In a particular aspect, the one or more encoding layers 344 have a different configuration setting (e.g., different weights, different biases, etc.) as the one or more encoding layers 644. In a particular aspect, the data dependent encoder 144 corresponds to a pre-trained language encoder.

In a particular aspect, the data dependent encoder 144 is configured to map each word of the context 135 to every other word of the context 135. In a particular implementation, the input stage 642 is configured to generate a token embedding corresponding to each element (e.g., word, punctuation, etc.) of the context 135. In a particular aspect, the input stage 642 also generates a classification (CLS) token embedding (e.g., [CLS]) indicating a beginning of the context 135. In a particular aspect, the input stage 642 is configured to generate positional embeddings corresponding to the token embeddings. For example, a positional embedding corresponding to a token embedding indicates a position of the corresponding element in the context 135. The input stage 642 is configured to provide the token embeddings, the positional embeddings, or a combination thereof, as input to the one or more encoding layers 644. In some aspects, the one or more encoding layers 644 are configured and operate as described with reference to the one or more encoding layers 844 depicted in FIG. 8.

Figure 7:
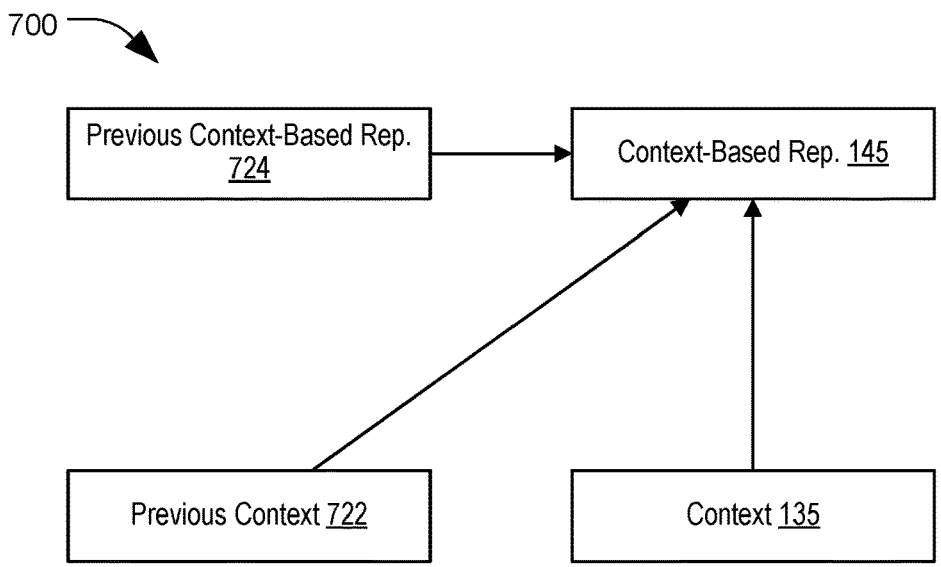
FIG. 7 is a diagram of an illustrative aspect of operations of the data dependent encoder of the system of FIG. 1, in accordance with some examples of the present disclosure.

Referring to FIG. 7, a diagram 700 of an illustrative aspect of operations of the data dependent encoder 144 is shown. In a particular aspect, the data dependent encoder 144 is configured to process the context 135 based on processing of a previous context 722.

In a particular aspect, the data dependent encoder 144 generates the context-based representation 145 based on the context 135 and the previous context 722. For example, the data dependent encoder 144 processes input data (e.g., an input embedding) corresponding to the previous context 722 to generate a previous context-based representation 724 and a state of the data dependent encoder 144 is updated during processing of the input data. The data dependent encoder 144 initiates processing of input data (e.g., an input embedding) corresponding to the context 135 in the updated state to generate the context-based representation 145.

In a particular aspect, the data dependent encoder 144 generates the context-based representation 145 based on the previous context-based representation 724. For example, the input stage 642 generates input data (e.g., an input embedding) based on the context 135 and the previous context-based representation 724 (e.g., feedback context-based representation) and provides the input data to the one or more encoding layers 644 to generate the context-based representation 145. The data dependent encoder 144 can thus generate the context-based representation 145 based on states corresponding to relationships between the context 135 and the previous context 722.

Figure 9:
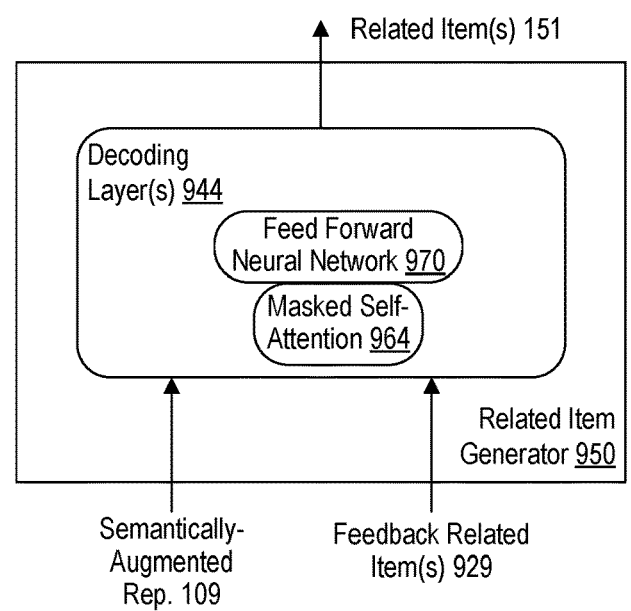
FIG. 9 is a diagram of an illustrative aspect of operations of a related item generator of the system of FIG. 1, in accordance with some examples of the present disclosure.

Referring to FIG. 9, a diagram 900 of an illustrative aspect of operations of a related item generator 950 is shown. In a particular aspect, the related item generator 950 corresponds to the related item generator 150 of FIG. 1.

The related item generator 950 (e.g., a generative decoder) includes one or more decoding layers 944. Each decoding layer of the one or more decoding layers 944 includes a masked attention layer and a feed forward layer. For example, the masked attention layer includes a masked self-attention 964 (e.g., a masked decoder attention network). The feed forward layer includes a feed forward neural network 970 (e.g., a fully connected feed forward neural network). In a particular aspect, the one or more decoding layers 944 are configured to process the semantically-augmented representation 109.

In a particular aspect, the one or more decoding layers 944 receive one or more feedback related items 929 corresponding to one or more related items 151 generated by the related item generator 150 for a previous time step. A decoding layer of the one or more decoding layers 944 processes data that is based on the semantically-augmented representation 109, the one or more feedback related items 929, or a combination thereof. In a particular aspect, the masked self-attention 964 masks future positions in the input to the masked self-attention 964. The masked self-attention 964 generates Query vectors, Key vectors, and Value vectors from the masked version of the input to the masked self-attention 964. Each attention head of the masked self-attention 964 (e.g., a multi-head attention) processes a Query vector, a Key vector, and a Value vector to generate an output. The independent outputs of the attention heads of the masked self-attention 964 are concatenated and linearly transformed to generate an output of the masked self-attention 964. The output of the masked self-attention 964 is provided to the feed forward neural network 970 of the decoding layer. The output of the feed forward neural network 970 of a particular decoding layer of the one or more decoding layers 944 is output as the one or more related items 151.

The one or more decoding layers 944 including a single decoding layer is provided as an illustrative example. In other examples, the one or more decoding layers 944 include multiple decoding layers with an input of the related item generator 950 coupled to the masked self-attention 964 of an initial decoding layer, the feed forward neural network 970 of each previous decoding layer coupled to the masked self-attention 964 of a subsequent encoding layer, and the feed forward neural network 970 of a last decoding layer coupled to an output of the related item generator 950.

In a particular aspect, the network configurer 360 of FIG. 3 adjusts configuration parameters (e.g., neural network weights, biases, etc.) of the related item generator 950 during a configuration (e.g., training, test, or update) phase based on a loss metric. For example, the network configurer 360 determines a loss metric based on a comparison of one or more related items (e.g., predetermined values) and the one or more related items 151 (e.g., predicted values). The network configurer 360, in response to determining that the loss metric fails to satisfy a loss threshold, updates the neural network configuration settings (e.g., weights, biases, etc.) of the one or more encoding layers 344 of the encoder 340 of FIG. 3, the masked self-attention 964 of the one or more decoding layers 944, or a combination thereof.

Figure 10:
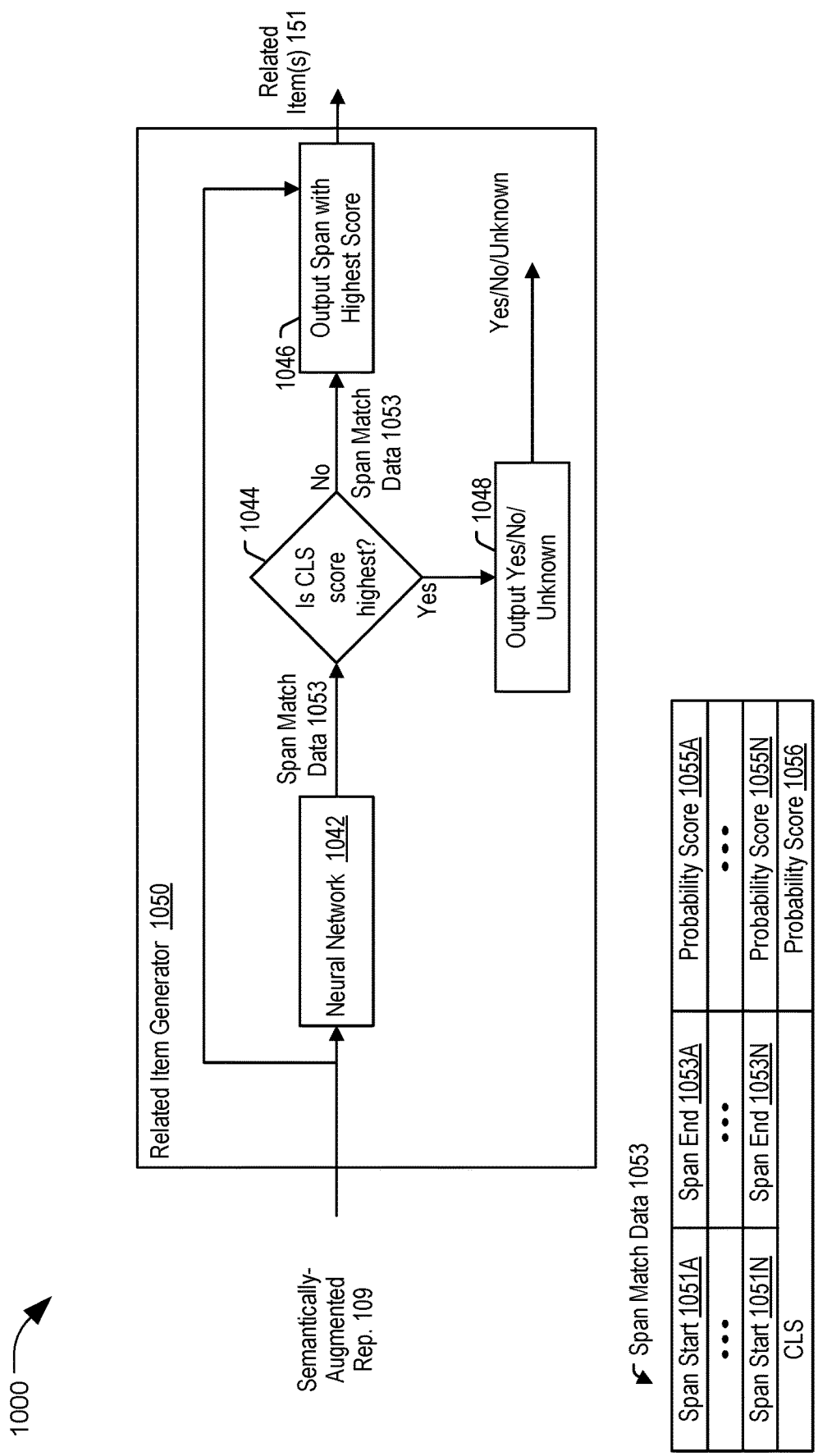
FIG. 10 is a diagram of another illustrative aspect of a related item generator of the system of FIG. 1, in accordance with some examples of the present disclosure.

Referring to FIG. 10, a diagram 1000 of an illustrative aspect of the related item generator 1050 is shown. In a particular aspect, the related item generator 1050 corresponds to the related item generator 150 of FIG. 1.

The related item generator 1050 includes a neural network 1042 (e.g., BERT based network) that is configured to process the semantically-augmented representation 109 to generate span match data 1053. The span match data 1053 indicates a probability of a span of the context 135 (e.g., "At 4 PM Ravi was feeling irritated in the living room. Laehoon opened the refrigerator at 5 PM") corresponding to a related item associated with the one or more items of interest 147. For example, the span match data 1053 indicates that a first span (e.g., "At 4 PM Ravi was feeling irritated") starting from a span start 1051A (e.g., a position corresponding to "At") to a span end 1053 (e.g., a position corresponding to "irritated") of the context 135 has a probability score 1055A (e.g., 0.9) of corresponding to a related item associated with the one or more items of interest 147 (e.g., "How was Ravi feeling at 4 PM?"). As another example, the span match data 1053 indicates that a second span (e.g., "Laehoon opened the refrigerator at 5 PM") starting from a span start 1051N (e.g., a position corresponding to "Laehoon") to a span end 1053N (e.g., a position corresponding to the last "PM") has a probability score 1055N (e.g., 0.3) of corresponding to a related item associated with the one or more items of interest 147. In a particular aspect, the span match data 1053 includes a probability score 1056 corresponding to the CLS token (indicating the beginning of the context 135).

The related item generator 1050 determines, at block 1044, whether the probability score 1056 of the CLS token indicates a highest probability among the probability scores indicated by the span match data 1053. The related item generator 1050, in response to determining that the probability score 1056 of the CLS token does not indicate the highest probability among the probability scores, outputs the span associated with the probability score indicating the highest probability, at block 1046. For example, the related item generator 1050, in response to determining that the probability score 1055A (e.g., 0.9) is highest among the probability scores, extracts the first span (e.g., "At 4 PM Ravi was feeling irritated") starting from the span start 1051A (e.g., the position corresponding to "At") to the span end 1053 (e.g., a position corresponding to "irritated") from the context 135 or the semantically-augmented representation 109. The related item generator 1050 outputs the first span (e.g., "At 4 PM Ravi was feeling irritated") as the one or more related items 151.

At 1048, the related item generator 1050, in response to determining that the probability score 1056 of the CLS token is highest among the probability scores, determines that the context 135 (e.g., "At 4 PM Ravi was feeling irritated in the living room. Laehoon opened the refrigerator at 5 PM") does not include any items related to the one or more items of interest 147 (e.g., "Who is in the study?"). In a particular aspect, the related item generator 1050 outputs a value (e.g., "yes, no, or unknown") indicating that no items are detected in the context 135 (e.g., "At 4 PM Ravi was feeling irritated in the living room. Laehoon opened the refrigerator at 5 PM") that correspond to the one or more items of interest 147 (e.g., "Who is in the study?").

Figure 11:
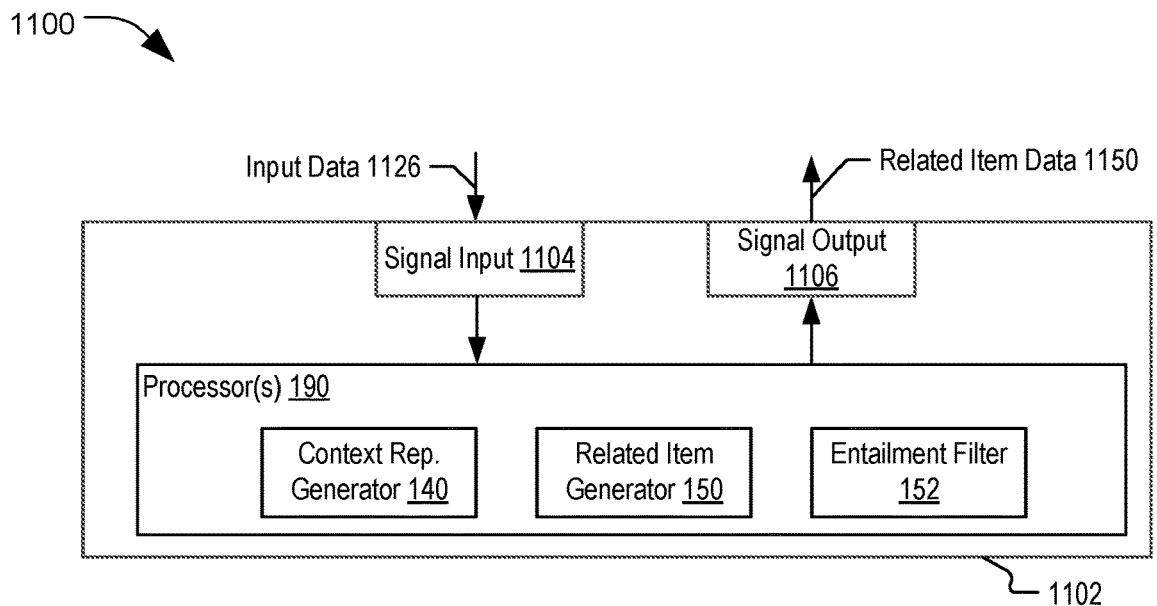
FIG. 11 illustrates an example of an integrated circuit operable to generate semantically-augmented context representations, in accordance with some examples of the present disclosure.

FIG. 11 depicts an implementation 1100 of the device 102 as an integrated circuit 1102 that includes the one or more processors 190. In a particular aspect, the one or more processors 190 include the context representation generator 140, the related item generator 150, the entailment filter 152, or a combination thereof.

The integrated circuit 1102 also includes a signal input 1104, such as one or more bus interfaces, to enable input data 1126 to be received for processing. The integrated circuit 1102 also includes a signal output 1106, such as a bus interface, to enable sending of an output signal, such as related item data 1150. In a particular aspect, the input data 1126 includes the sensor data 126, the context 135, the one or more items of interest 147, the semantic-based representation 143, the context-based representation 145, the semantically-augmented representation 109, the one or more related items 151, the one or more filtered related items 153, or a combination thereof. In a particular aspect, the related item data 1150 indicates the one or more related items 151, the one or more filtered related items 153, the output data 171, or a combination thereof.

Figure 12:
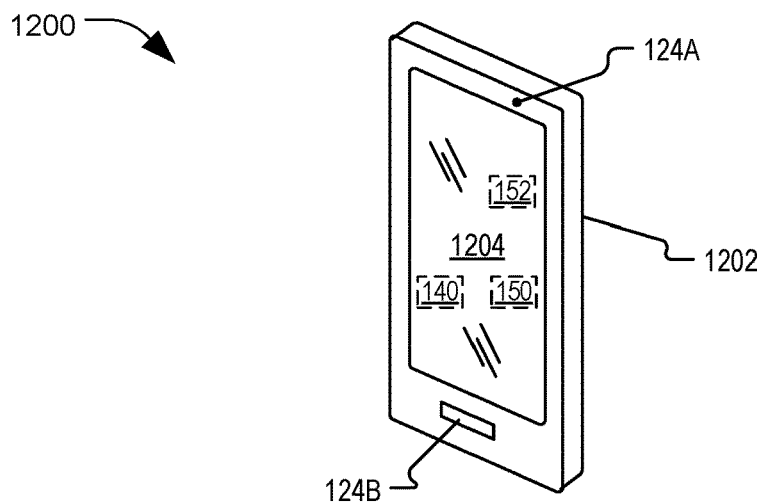
FIG. 12 is a diagram of a mobile device operable to generate semantically-augmented context representations, in accordance with some examples of the present disclosure.
Figure 13:
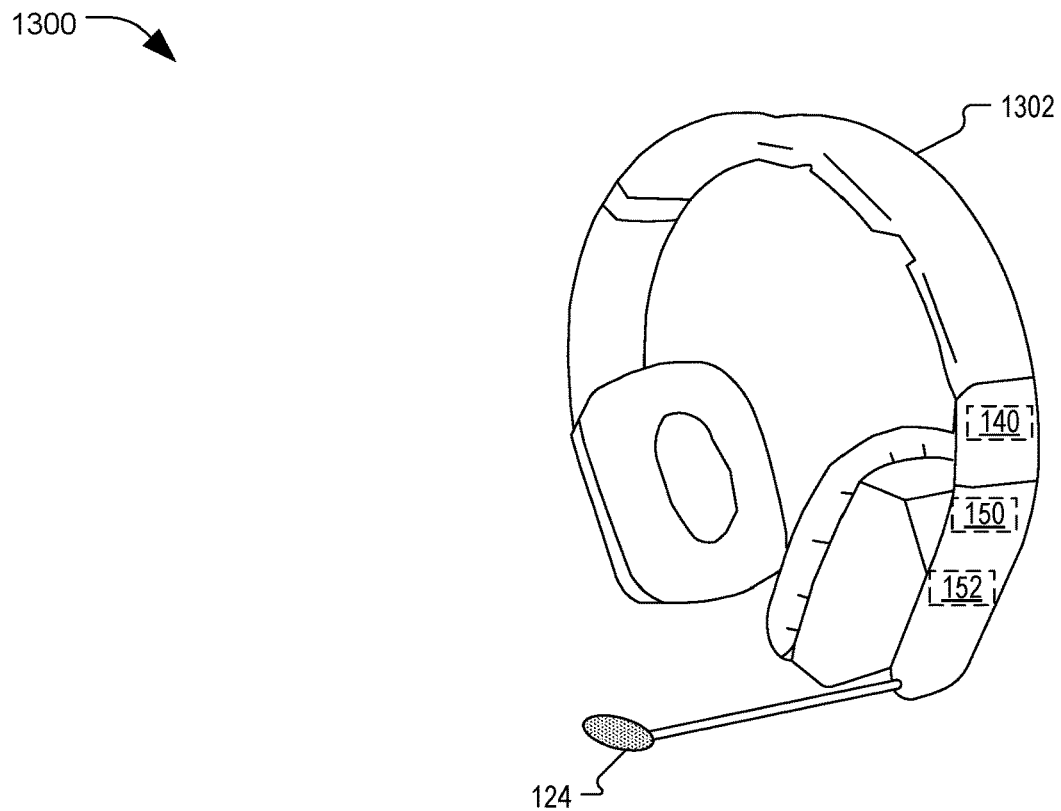
FIG. 13 is a diagram of a headset operable to generate semantically-augmented context representations, in accordance with some examples of the present disclosure.
Figure 14:
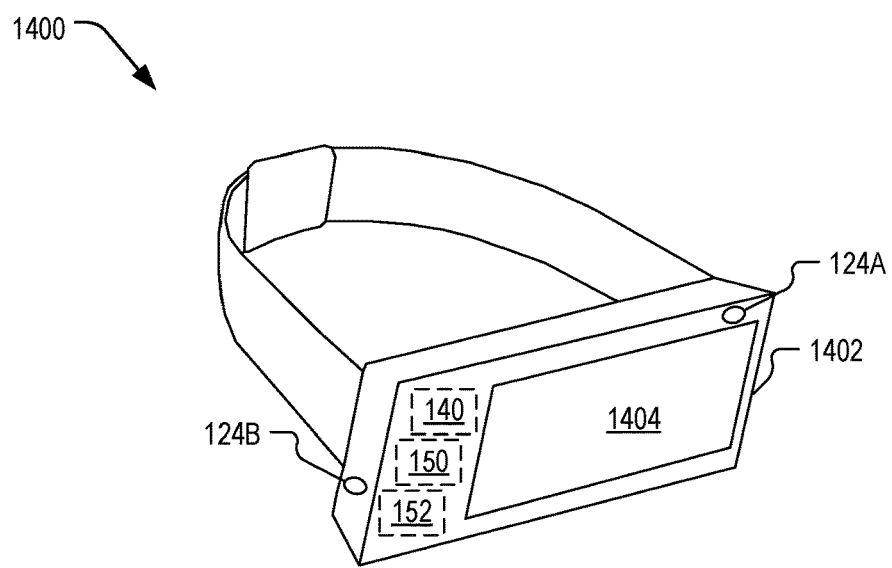
FIG. 14 is a diagram of a wearable electronic device operable to generate semantically-augmented context representations, in accordance with some examples of the present disclosure.
Figure 15:
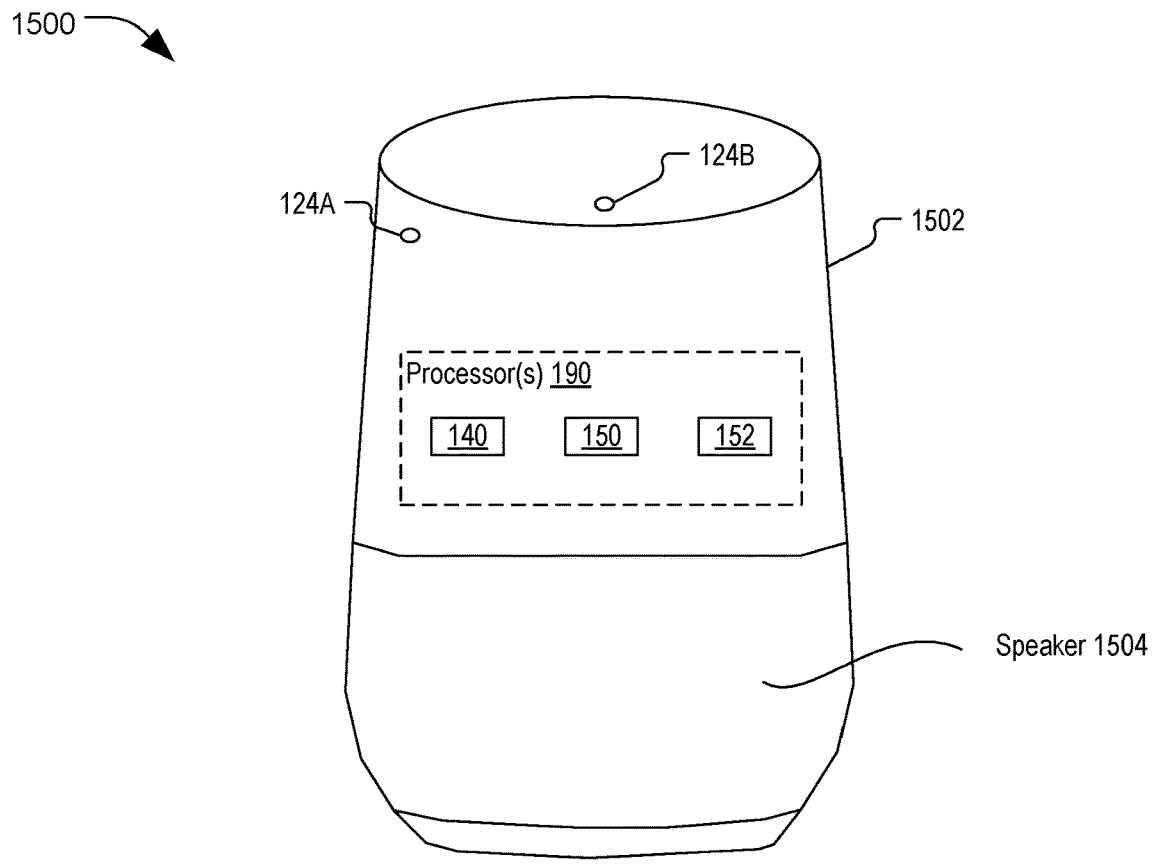
FIG. 15 is a diagram of a voice-controlled speaker system operable to generate semantically-augmented context representations, in accordance with some examples of the present disclosure.
Figure 16:
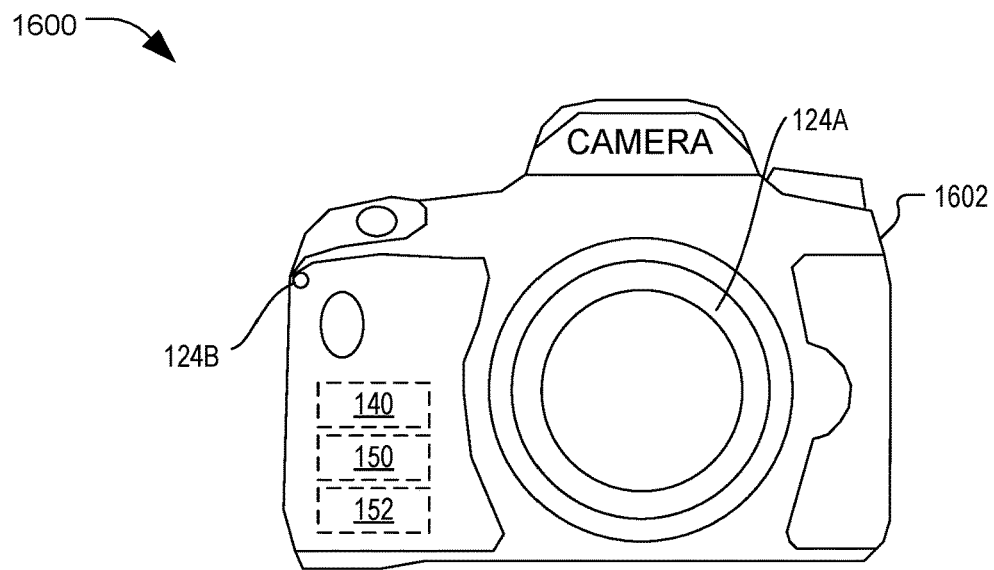
FIG. 16 is a diagram of a camera operable to generate semantically-augmented context representations, in accordance with some examples of the present disclosure.
Figure 17:
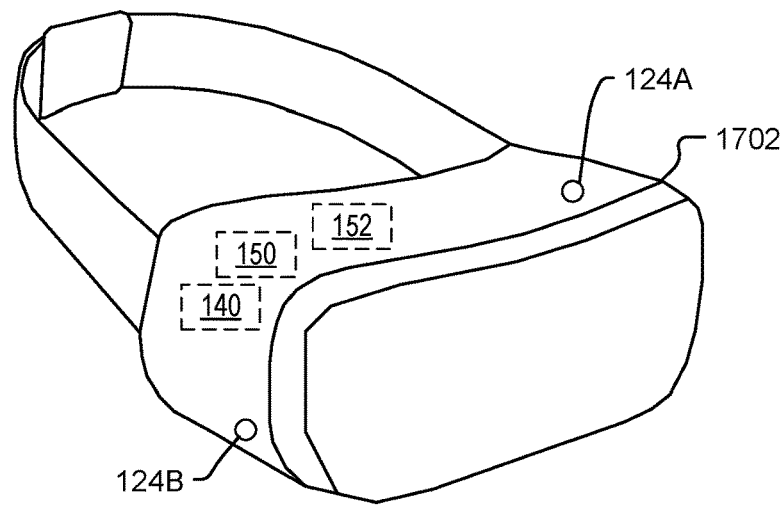
FIG. 17 is a diagram of a headset, such as a virtual reality, mixed reality, or augmented reality headset, operable to generate semantically-augmented context representations, in accordance with some examples of the present disclosure.
Figure 18:
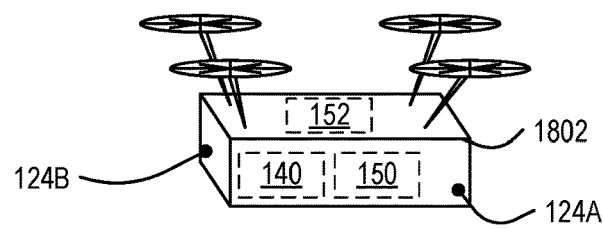
FIG. 18 is a diagram of a first example of a vehicle operable to generate semantically-augmented context representations, in accordance with some examples of the present disclosure.
Figure 19:
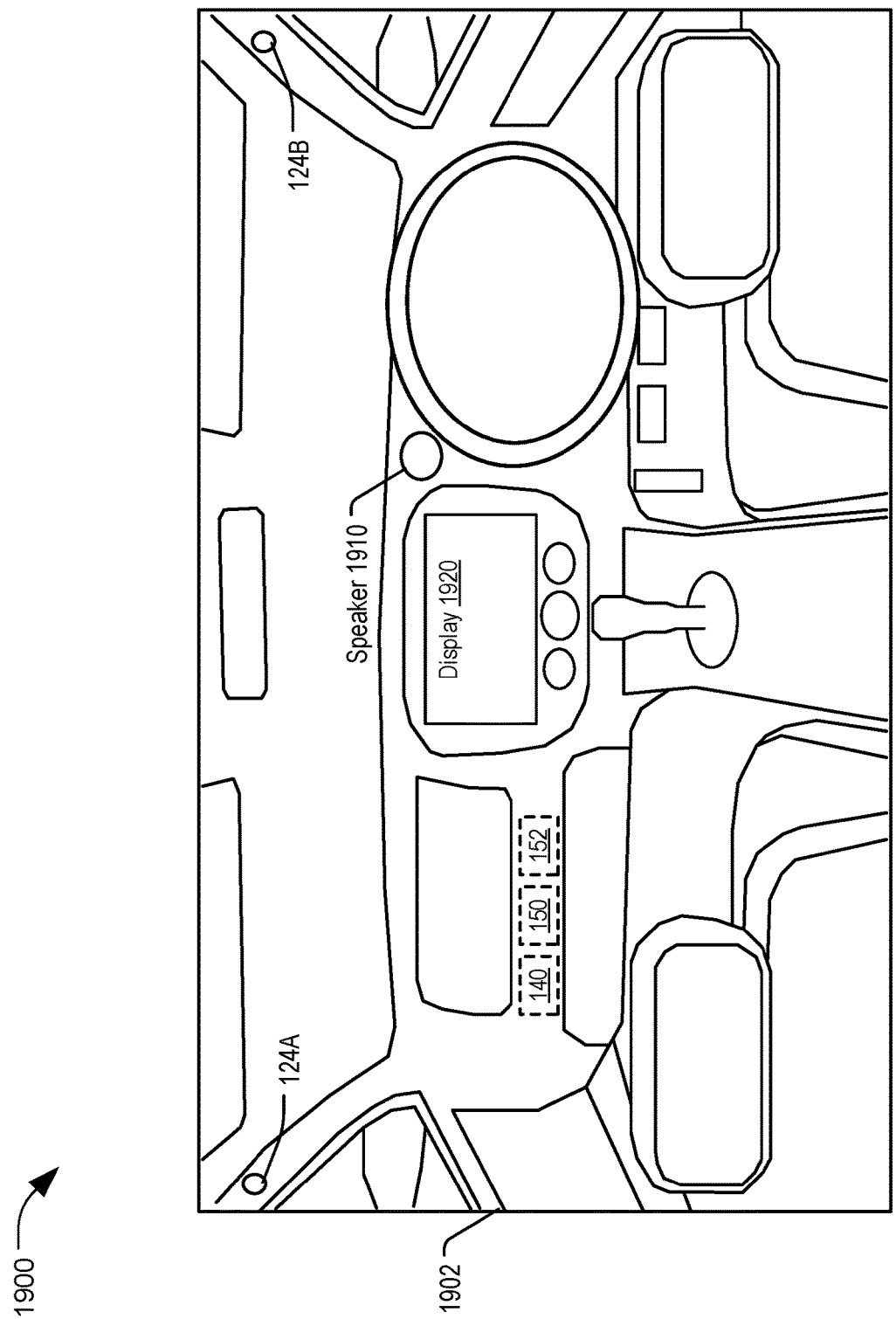
FIG. 19 is a diagram of a second example of a vehicle operable to generate semantically-augmented context representations, in accordance with some examples of the present disclosure.

The integrated circuit 1102 enables implementation of semantically-augmented context representation generation as a component in a system, such as a mobile phone or tablet as depicted in FIG. 12, a headset as depicted in FIG. 13, a wearable electronic device as depicted in FIG. 14, a voice-controlled speaker system as depicted in FIG. 15, a camera as depicted in FIG. 16, a virtual reality, mixed reality, or augmented reality headset as depicted in FIG. 17, or a vehicle as depicted in FIG. 18 or FIG. 19.

FIG. 12 depicts an implementation 1200 in which the device 102 includes a mobile device 1202, such as a phone or tablet, as illustrative, non-limiting examples. The mobile device 1202 includes a sensor 124A (e.g., a camera), a sensor 124B (e.g., a microphone), and a display screen 1204. In a particular aspect, the mobile device 1202 includes one or more additional sensors. Components of the one or more processors 190, including the context representation generator 140, the related item generator 150, the entailment filter 152, or a combination thereof, are integrated in the mobile device 1202 and are illustrated using dashed lines to indicate internal components that are not generally visible to a user of the mobile device 1202. In a particular example, the context representation generator 140 generates the context 135 of a user of the mobile device 1202 based on the sensor data 126 of the sensors 124, calendar data (e.g., appointments) of the user, communication data (e.g., email, voice mail, etc.) of the user, or a combination thereof. The context representation generator 140 generates the semantically-augmented representation 109 based on the context 135 and one or more items of interest 147, and the related item generator 150 generates the one or more related items 151 based on the semantically-augmented representation 109.

In a particular aspect, the one or more items of interest 147 are based on user input. For example, the user of the mobile device 1202 provides the one or more items of interest 147 (e.g., "What did I order for lunch on Thursday?") via user input to extract the one or more related items 151 (e.g., "Turkey sandwich") from the context 135. In a particular example, the mobile device 1202 receives the one or more items of interest 147 (e.g., "Who was speeding?") from another device (e.g., a server) and provides the one or more related items 151 (or the one or more filtered related items 153) to the other device.

FIG. 13 depicts an implementation 1300 in which the device 102 includes a headset device 1302. The headset device 1302 includes a sensor 124 (e.g., a microphone). Components of the one or more processors 190, including the context representation generator 140, the related item generator 150, the entailment filter 152, or a combination thereof, are integrated in the headset device 1302. In a particular example, the context representation generator 140, the related item generator 150, the entailment filter 152, or a combination thereof operate to generate the one or more related items 151 (or the one or more filtered related items 153) indicating user activity, which may cause the headset device 1302 to perform one or more operations at the headset device 1302, to transmit the one or more related items 151 (or the one or more filtered related items 153) corresponding to the user voice activity to a second device (not shown) for further processing, or a combination thereof.

FIG. 14 depicts an implementation 1400 in which the device 102 includes a wearable electronic device 1402, illustrated as a "smart watch." The context representation generator 140, the related item generator 150, the entailment filter 152, a sensor 124A (e.g., a camera), a sensor 124B (e.g., a microphone), or a combination thereof, are integrated into the wearable electronic device 1402. In a particular example, the context representation generator 140, the related item generator 150, the entailment filter 152, or a combination thereof operate to generate the one or more related items 151 (or the one or more filtered related items 153) indicating user activity, which is then processed to perform one or more operations at the wearable electronic device 1402, such as to launch a graphical user interface or otherwise display information associated with the user activity at a display screen 1404 of the wearable electronic device 1402. To illustrate, the wearable electronic device 1402 may include a display screen 1404 that is configured to display a notification based on user activity detected by the wearable electronic device 1402. In a particular example, the wearable electronic device 1402 includes a haptic device that provides a haptic notification (e.g., vibrates) in response to detection of user activity. For example, the haptic notification can cause a user to look at the wearable electronic device 1402 to see a displayed notification indicating detection of a keyword spoken by the user. The wearable electronic device 1402 can thus alert a user with a hearing impairment or a user wearing a headset that the user activity is detected.

FIG. 15 is an implementation 1500 in which the device 102 includes a wireless speaker and voice activated device 1502. The wireless speaker and voice activated device 1502 can have wireless network connectivity and is configured to execute an assistant operation. The one or more processors 190 including the context representation generator 140, the related item generator 150, the entailment filter 152, a sensor 124A (e.g., a camera), a sensor 124B (e.g., a microphone), or a combination thereof, are included in the wireless speaker and voice activated device 1502. The wireless speaker and voice activated device 1502 also includes a speaker 1504. During operation, in response to receiving a verbal command (e.g., "set to my preferences") corresponding to the one or more items of interest 147, the wireless speaker and voice activated device 1502 can execute assistant operations, such as via operation of the context representation generator 140, the related item generator 150, the entailment filter 152, or a combination thereof (e.g., an integrated assistant application). For example, the one or more related items 151 (or the one or more filtered related items 153) indicate the user and the previous settings for the user extracted from the context 135. The assistant operations can include adjusting a temperature, playing music, turning on lights, providing information, etc. For example, the assistant operations are performed responsive to receiving a command after a keyword or key phrase (e.g., "hello assistant").

FIG. 16 depicts an implementation 1600 in which the device 102 includes a portable electronic device that corresponds to a camera device 1602. The context representation generator 140, the related item generator 150, the entailment filter 152, a sensor 124A (e.g., an image sensor), a sensor 124B (e.g., a microphone), or a combination thereof, are included in the camera device 1602. During operation, in response to detecting user activity via operation of the context representation generator 140, the related item generator 150, the entailment filter 152, or a combination thereof, the camera device 1602 can execute operations responsive to the user activity, such as to adjust image or video capture settings, image or video playback settings, or image or video capture instructions, as illustrative examples.

FIG. 17 depicts an implementation 1700 in which the device 102 includes a portable electronic device that corresponds to a virtual reality, mixed reality, or augmented reality headset 1702. The context representation generator 140, the related item generator 150, the entailment filter 152, a sensor 124A (e.g., a camera), a sensor 124B (e.g., a microphone), or a combination thereof, are integrated into the headset 1702. User activity detection can be performed based on sensor data received from the sensors 124 of the headset 1702. A visual interface device is positioned in front of the user's eyes to enable display of augmented reality, mixed reality, or virtual reality images or scenes to the user while the headset 1702 is worn. In a particular example, the visual interface device is configured to display a notification indicating user activity detected in the sensor data.

FIG. 18 depicts an implementation 1800 in which the device 102 corresponds to, or is integrated within, a vehicle 1802, illustrated as a manned or unmanned aerial device (e.g., a package delivery drone). The context representation generator 140, the related item generator 150, the entailment filter 152, a sensor 124A (e.g., a camera), a sensor 124B (e.g., a microphone), or a combination thereof, are integrated into the vehicle 1802. User activity detection can be performed based on sensor data 126 received from the sensors 124 of the vehicle 1802, such as for assembly instructions. For example, the context representation generator 140 can generate the semantically-augmented representation 109 by processing the sensor data 126 based on one or more items of interest 147 (e.g., "What assembly step is the user performing?"). The related item generator 150 can generate the one or more related items 151 indicating the assembly step being performed. The vehicle 1802 can output audio-visual instructions indicating the next assembly step to be performed.

FIG. 19 depicts another implementation 1900 in which the device 102 corresponds to, or is integrated within, a vehicle 1902, illustrated as a car. The vehicle 1902 includes the one or more processors 190 including the context representation generator 140, the related item generator 150, the entailment filter 152, or a combination thereof. The vehicle 1902 also includes a sensor 124A (e.g., a camera), a sensor 124B (e.g., a microphone), or both. User activity detection can be performed based on sensor data received from the sensor 124 of the vehicle 1902. In some implementations, user activity detection can be performed based on an audio signal received from an interior microphone (e.g., the sensor 124B), such as for a voice command from an authorized passenger indicating the one or more items of interest 147. In another implementation, user activity detection can be performed on a configuration setting indicating the one or more items of interest 147 (e.g., "Who is speeding?") and the one or more related items 151 (or the one or more filtered related items 153) can be sent to a second device (e.g., a parent mobile device). In a particular implementation, in response to generating the one or more related items 151 (or the one or more filtered related items 153) via operation of the context representation generator 140, the related item generator 150, the entailment filter 152, or a combination thereof, the vehicle 1902 initiates one or more operations, such as automatically slowing down, playing an alert (e.g., "sending speeding notification to parent") via a speaker 1910, displaying the alert via a display screen 1920, or another operation.

Figure 20:
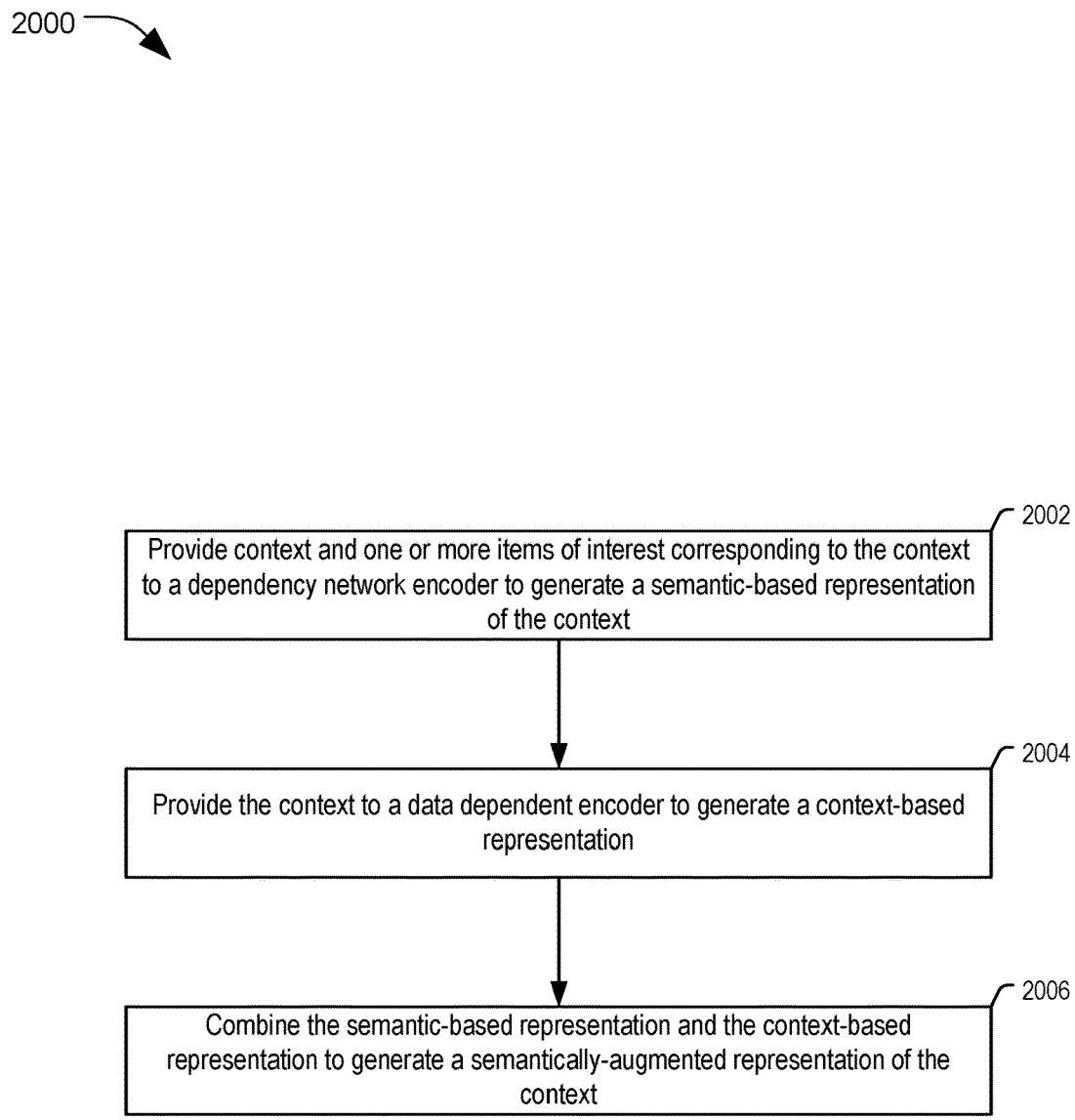
FIG. 20 is a flow chart of a particular implementation of a method of generating semantically-augmented context representation that may be performed by the device of FIG. 1, in accordance with some examples of the present disclosure.

Referring to FIG. 20, a particular implementation of a method 2000 of semantically-augmented context representation generation is shown. In a particular aspect, one or more operations of the method 2000 are performed by at least one of the context representation generator 140, the context generator 134, the combiner 108, the one or more processors 190, the device 102, the system 100 of FIG. 1, or a combination thereof.

The method 2000 includes providing context and one or more items of interest corresponding to the context to a dependency network encoder to generate a semantic-based representation of the context, at block 2002. For example, the context representation generator 140 of FIG. 1 provides the context 135 and the one or more items of interest 147 to the dependency network encoder 142 to generate the semantic-based representation 143, as described with reference to FIG. 1.

The method 2000 also includes providing the context to a data dependent encoder to generate a context-based representation, at block 2004. For example, the context representation generator 140 of FIG. 1 provides the context 135 to the data dependent encoder 144 to generate the context-based representation 145, as described with reference to FIG. 1.

The method 2000 further includes combining the semantic-based representation and the context-based representation to generate a semantically-augmented representation of the context, at block 2006. For example, the combiner 108 of FIG. 1 combines the semantic-based representation 143 and the context-based representation 145 to generate the semantically-augmented representation 109 of the context 135, as described with reference to FIG. 1.

The method 2000 thus enables generation of the semantically-augmented representation 109 of the context 135 by combining the semantic-based representation 143 and the context-based representation 145. The semantically-augmented representation 109 has advantages of both the context-based representation 145 (e.g., rich connections) and the semantic-based representation 143 (e.g., linguistic connections).

The method 2000 of FIG. 20 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2000 of FIG. 20 may be performed by a processor that executes instructions, such as described with reference to FIG. 21.

Figure 21:
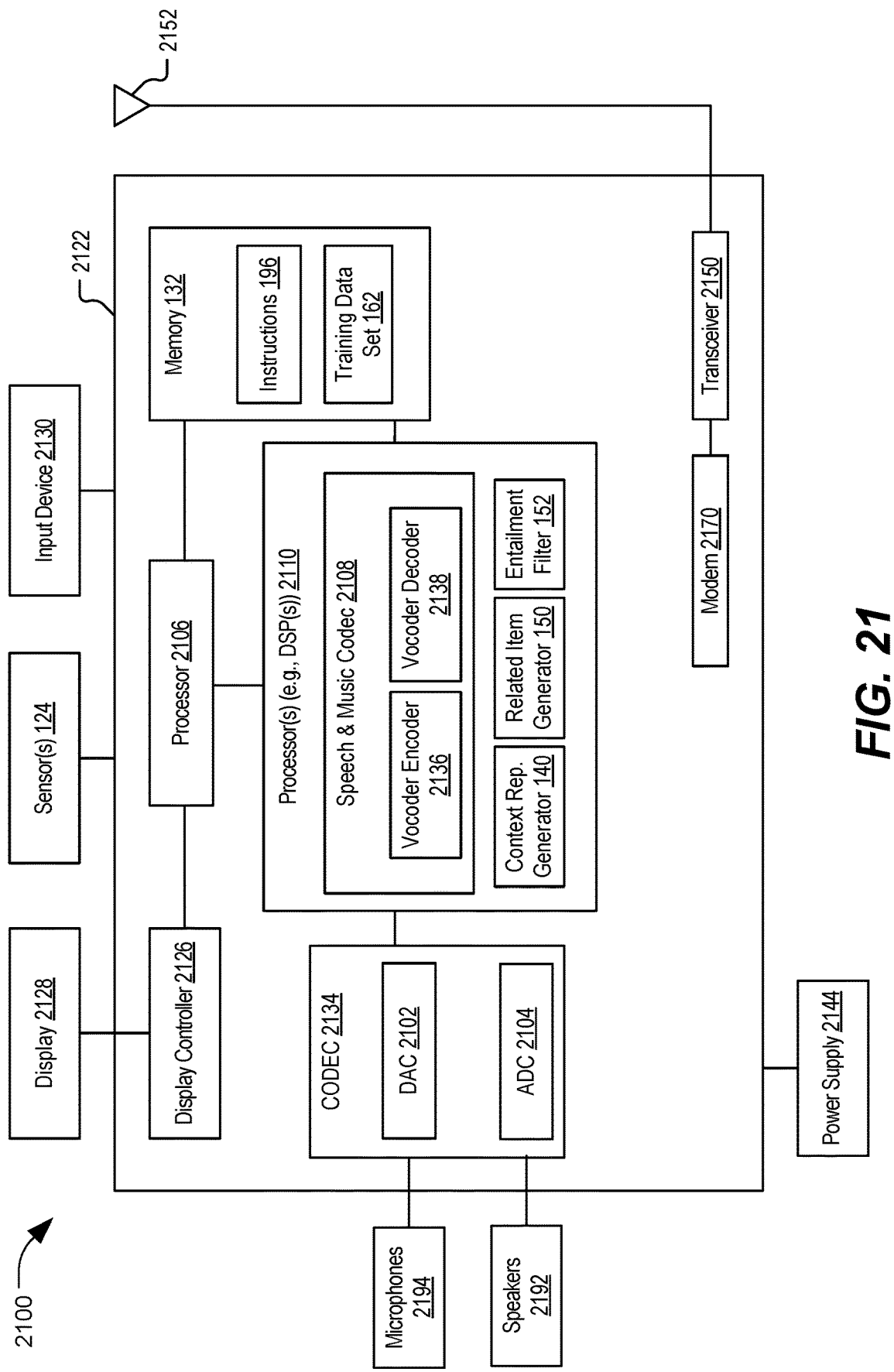
FIG. 21 is a block diagram of a particular illustrative example of a device that is operable to generate semantically-augmented context representations, in accordance with some examples of the present disclosure.

Referring to FIG. 21, a block diagram of a particular illustrative implementation of a device is depicted and generally designated 2100. In various implementations, the device 2100 may have more or fewer components than illustrated in FIG. 21. In an illustrative implementation, the device 2100 may correspond to the device 102. In an illustrative implementation, the device 2100 may perform one or more operations described with reference to FIGS. 1-20.

In a particular implementation, the device 2100 includes a processor 2106 (e.g., a CPU). The device 2100 may include one or more additional processors 2110 (e.g., one or more DSPs). In a particular aspect, the one or more processors 190 of FIG. 1 corresponds to the processor 2106, the processors 2110, or a combination thereof. The processors 2110 may include a speech and music coder-decoder (CODEC) 2108 that includes a voice coder ("vocoder") encoder 2136, a vocoder decoder 2138, or both. In a particular aspect, the processors 2110 include the context representation generator 140, the related item generator 150, the entailment filter 152, or a combination thereof.

The device 2100 may include the memory 132 and a CODEC 2134. The memory 132 may include the instructions 196, that are executable by the one or more additional processors 2110 (or the processor 2106) to implement the functionality described with reference to the context representation generator 140, the related item generator 150, the entailment filter 152, or a combination thereof. The device 2100 may include a modem 2170 coupled, via a transceiver 2150, to an antenna 2152.

The device 2100 may include a display 2128 coupled to a display controller 2126. One or more speakers 2192 and one or more microphones 2194 may be coupled to the CODEC 2134. The CODEC 2134 may include a digital-to-analog converter (DAC) 2102, an analog-to-digital converter (ADC) 2104, or both. In a particular implementation, the CODEC 2134 may receive analog signals from the one or more microphones 2194, convert the analog signals to digital signals using the analog-to-digital converter 2104, and provide the digital signals to the speech and music codec 2108. The speech and music codec 2108 may process the digital signals, and the digital signals may further be processed by the context representation generator 140. In a particular implementation, the speech and music codec 2108 may provide digital signals to the CODEC 2134. The CODEC 2134 may convert the digital signals to analog signals using the digital-to-analog converter 2102 and may provide the analog signals to the one or more speakers 2192.

In a particular implementation, the device 2100 may be included in a system-in-package or system-on-chip device 2122. In a particular implementation, the memory 132, the processor 2106, the processors 2110, the display controller 2126, the CODEC 2134, and the modem 2170 are included in a system-in-package or system-on-chip device 2122. In a particular implementation, an input device 2130, the one or more sensors 124, and a power supply 2144 are coupled to the system-on-chip device 2122. Moreover, in a particular implementation, as illustrated in FIG. 21, the display 2128, the input device 2130, the one or more sensors 124, the one or more speakers 2192, the one or more microphones 2194, the antenna 2152, and the power supply 2144 are external to the system-on-chip device 2122. In a particular implementation, each of the display 2128, the input device 2130, the one or more sensors 124, the one or more speakers 2192, the one or more microphones 2194, the antenna 2152, and the power supply 2144 may be coupled to a component of the system-on-chip device 2122, such as an interface or a controller.

The device 2100 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a mixed reality (MR)

device, an augmented reality (AR) device, a base station, a mobile device, or any combination thereof.

In conjunction with the described implementations, an apparatus includes means for providing context and one or more items of interest corresponding to the context to a dependency network encoder to generate a semantic-based representation of the context. For example, the means for providing the context and the one or more items of interest can correspond to the context generator 134, the context representation generator 140, the one or more processors 190, the device 102, the system 100 of FIG. 1, the processor 2106, the one or more processors 2110, one or more other circuits or components configured to provide a context and one or more items of interest to a dependency network encoder, or any combination thereof.

The apparatus also includes means for providing the context to a data dependent encoder to generate a context-based representation. For example, the means for providing the context can correspond to the context generator 134, the context representation generator 140, the one or more processors 190, the device 102, the system 100 of FIG. 1, the processor 2106, the one or more processors 2110, one or more other circuits or components configured to provide a context to a data dependent encoder, or any combination thereof.

The apparatus further includes means for combining the semantic-based representation and the context-based representation to generate a semantically-augmented representation of the context. For example, the means for combining can correspond to the combiner 108, the context representation generator 140, the one or more processors 190, the device 102, the system 100 of FIG. 1, the processor 2106, the one or more processors 2110, one or more other circuits or components configured to combine the semantic-based representation and the context-based representation, or any combination thereof.

In some implementations, a non-transitory computer-readable medium (e.g., a computer-readable storage device, such as the memory 132) includes instructions (e.g., the instructions 196) that, when executed by one or more processors (e.g., the one or more processors 2110 or the processor 2106), cause the one or more processors to provide context (e.g., the context 135) and one or more items of interest (e.g., the one or more items of interest 147) corresponding to the context to a dependency network encoder (e.g., the dependency network encoder 142) to generate a semantic-based representation (e.g., the semantic-based representation 143) of the context. The instructions, when executed by the one or more processors, also cause the one or more processors to provide the context to a data dependent encoder (e.g., the data dependent encoder 144) to generate a context-based representation (e.g., the context-based representation 145). The instructions, when executed by the one or more processors, further cause the one or more processors to combine the semantic-based representation and the context-based representation to generate a semantically-augmented representation (e.g., the semantically-augmented representation 109) of the context.

Particular aspects of the disclosure are described below in sets of interrelated clauses:

According to Clause 1, a device includes: a memory configured to store instructions; and one or more processors configured to execute the instructions to: provide context and one or more items of interest corresponding to the context to a dependency network encoder to generate a semantic-based representation of the context; provide the context to a data dependent encoder to generate a context-based representation; and combine the semantic-based representation and the context-based representation to generate a semantically-augmented representation of the context.

Clause 2 includes the device of Clause 1, wherein the one or more processors are further configured to receive sensor data from one or more sensors and generate the context based on the sensor data.

Clause 3 includes the device of Clause 2, wherein the one or more sensors include a camera, wherein the sensor data includes image data from the camera, and wherein the one or more processors are configured to generate the context based at least in part on performing, on the image data, object recognition, emotion recognition, location recognition, person recognition, or a combination thereof.

Clause 4 includes the device of Clause 2 or Clause 3, wherein the one or more sensors include a microphone, wherein the sensor data includes audio data from the microphone, and wherein the one or more processors are configured to generate the context based at least in part on performing, on the audio data, speech recognition, emotion recognition, location recognition, speaker recognition, or a combination thereof.

Clause 5 includes the device of any of Clause 1 to Clause 4, wherein the one or more items include an answer indicated by the context, and wherein the one or more processors are further configured to: provide the semantically-augmented representation of the context to a generative decoder to generate one or more predicted questions for the answer; and provide the one or more predicted questions to an entailment filter to generate one or more filtered predicted questions, wherein the one or more filtered predicted questions are included in a training set to train a question answer network.

Clause 6 includes the device of any of Clause 1 to Clause 4, wherein the one or more processors are further configured to provide the semantically-augmented representation of the context to a generative decoder to generate one or more related items.

Clause 7 includes the device of Clause 6, wherein the one or more items of interest include an answer indicated by the context, and wherein the one or more related items include a predicted question for the answer.

Clause 8 includes the device of Clause 6, wherein the one or more items of interest include a question related to the context, and wherein the one or more related items include a predicted answer to the question.

Clause 9 includes the device of any of Clause 6 to Clause 8, wherein the one or more processors are configured to provide the one or more related items to an entailment filter to generate one or more filtered related items.

Clause 10 includes the device of any of Clause 1 to Clause 9, wherein the dependency network encoder is further configured to: provide the context to a dependency parser to generate a dependency parsing graph; generate node embeddings based at least in part on elements of the context corresponding to nodes of the dependency parsing graph; and provide an input embedding to one or more encoding layers to generate the semantic-based representation of the context, the input embedding based at least in part on the node embeddings.

Clause 11 includes the device of Clause 10, wherein the input embedding indicates, for each node embedding of the node embeddings, parts of speech of one or more elements of the context that correspond to the node embedding.

Clause 12 includes the device of Clause 10 or Clause 11, wherein the input embedding indicates, for each node embedding of the node embeddings, whether one or more elements of the context that correspond to the node embedding are associated with the one or more items of interest.

Clause 13 includes the device of any of Clause 10 to Clause 12, wherein an encoding layer of the one or more encoding layers includes an attention layer and a feed forward layer, wherein the attention layer includes a multi-head attention, wherein an input of the attention layer is based on the input embedding, and wherein the semantic-based representation of the context is based on an output of the attention layer.

Clause 14 includes the device of any of Clause 10 to Clause 13, wherein the dependency network encoder further includes a prediction layer, wherein an input of the prediction layer is based on the semantic-based representation of the context, and wherein an output of the prediction layer indicates one or more elements of the context that are predicted to be related to the one or more items of interest.

Clause 15 includes the device of any of Clause 10 to Clause 14, wherein the dependency parser is configured to generate the dependency parsing graph based at least in part on a previous context.

Clause 16 includes the device of any of Clause 10 to Clause 15, wherein the one or more encoding layers are configured to generate the semantic-based representation of the context based at least in part on a second input embedding, wherein the second input embedding is associated with a second dependency parsing graph that is based on a previous context.

Clause 17 includes the device of any of Clause 10 to Clause 16, wherein the one or more encoding layers are configured to generate the semantic-based representation of the context based at least in part on a second semantic-based representation of a previous context.

Clause 18 includes the device of any of Clause 1 to Clause 17, wherein the data dependent encoder is configured to: generate an input embedding based on elements of the context; and provide the input embedding to one or more encoding layers to generate the context-based representation.

Clause 19 includes the device of Clause 18, wherein an encoding layer of the one or more encoding layers includes an attention layer and a feed forward layer, wherein the attention layer includes a multi-head attention, wherein an input of the attention layer is based on the input embedding, and wherein the context-based representation is based on an output of the attention layer.

Clause 20 includes the device of Clause 18 or Clause 19, wherein the one or more encoding layers are configured to generate the context-based representation based at least in part on a second input embedding associated with a previous context.

Clause 21 includes the device of any of Clause 18 to Clause 20, wherein the one or more encoding layers are configured to generate the context-based representation based at least in part on a second context-based representation of a previous context.

According to Clause 22, a method includes: providing, at a device, context and one or more items of interest corresponding to the context to a dependency network encoder to generate a semantic-based representation of the context; providing, at the device, the context to a data dependent encoder to generate a context-based representation; and combining, at the device, the semantic-based representation and the context-based representation to generate a semantically-augmented representation of the context.

Clause 23 includes the method of Clause 22, further including: receiving, at the device, sensor data from one or more sensors; and generating the context based on the sensor data.

Clause 24 includes the method of Clause 21 or Clause 22, further including: providing, at the device, the semantically-augmented representation of the context to a generative decoder to generate one or more predicted questions for an answer that is indicated by the context, wherein the one or more items include the answer; and providing, at the device, the one or more predicted questions to an entailment filter to generate one or more filtered predicted questions, wherein the one or more filtered predicted questions are included in a training set to train a question answer network.

According to Clause 25, a device includes: a memory configured to store instructions; and a processor configured to execute the instructions to perform the method of any of Clause 22 to 24.

According to Clause 26, a non-transitory computer-readable medium stores instructions that, when executed by a processor, cause the processor to perform the method of any of Clause 22 to Clause 24.

According to Clause 27, an apparatus includes means for carrying out the method of any of Clause 22 to Clause 24.

According to Clause 28, a non-transitory computer-readable medium stores instructions that, when executed by one or more processors, cause the one or more processors to: provide context and one or more items of interest corresponding to the context to a dependency network encoder to generate a semantic-based representation of the context; provide the context to a data dependent encoder to generate a context-based representation; and combine the semantic-based representation and the context-based representation to generate a semantically-augmented representation of the context.

Clause 29 includes the non-transitory computer-readable medium of Clause 28, wherein the instructions, when executed by the one or more processors, further cause the one or more processors to provide the semantically-augmented representation of the context to a generative decoder to generate one or more related items.

Clause 30 includes the non-transitory computer-readable medium of Clause 28 or Clause 29, wherein the one or more items of interest include an answer indicated by the context, and wherein the one or more related items include a predicted question for the answer.

Clause 31 includes the non-transitory computer-readable medium of Clause 28 or Clause 29, wherein the one or more items of interest include a question related to the context, and wherein the one or more related items include a predicted answer to the question.

According to Clause 32, an apparatus includes: means for providing context and one or more items of interest corresponding to the context to a dependency network encoder to generate a semantic-based representation of the context; means for providing the context to a data dependent encoder to generate a context-based representation; and means for combining the semantic-based representation and the context-based representation to generate a semantically-augmented representation of the context.

Clause 33 includes the apparatus of Clause 32, wherein the means for providing the context and the one or more items of interest to the dependency network encoder, the means for providing the context to the data dependent encoder, and the means for combining are integrated into at least one of a voice-activated device, a wireless speaker and voice activated device, a portable electronic device, a car, a vehicle, a computing device, a communication device, an internet-of-things (IoT) device, a virtual reality (VR) device, a mixed reality (MR) device, an augmented reality (AR) device, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store instructions; and
   one or more processors configured to execute the instructions to:
   provide context and one or more items of interest corresponding to the context to a dependency network encoder to generate a semantic-based representation of the context;
   provide the context to a data dependent encoder to generate a context-based representation; and
   combine the semantic-based representation and the context-based representation to generate a semantically-augmented representation of the context.

2. The device of claim 1, wherein the one or more processors are further configured to receive sensor data from one or more sensors and generate the context based on the sensor data.

3. The device of claim 2, wherein the one or more sensors include a camera, wherein the sensor data includes image data from the camera, and wherein the one or more processors are configured to generate the context based at least in part on performing, on the image data, object recognition, emotion recognition, location recognition, person recognition, or a combination thereof.

4. The device of claim 2, wherein the one or more sensors include a microphone, wherein the sensor data includes audio data from the microphone, and wherein the one or more processors are configured to generate the context based at least in part on performing, on the audio data, speech recognition, emotion recognition, location recognition, speaker recognition, or a combination thereof.

5. The device of claim 1, wherein the one or more items include an answer indicated by the context, and wherein the one or more processors are further configured to:
   provide the semantically-augmented representation of the context to a generative decoder to generate one or more predicted questions for the answer; and
   provide the one or more predicted questions to an entailment filter to generate one or more filtered predicted questions, wherein the one or more filtered predicted questions are included in a training set to train a question answer network.

6. The device of claim 1, wherein the one or more processors are further configured to provide the semantically-augmented representation of the context to a generative decoder to generate one or more related items.

7. The device of claim 6, wherein the one or more items of interest include an answer indicated by the context, and wherein the one or more related items include a predicted question for the answer.

8. The device of claim 6, wherein the one or more items of interest include a question related to the context, and wherein the one or more related items include a predicted answer to the question.

9. The device of claim 6, wherein the one or more processors are configured to provide the one or more related items to an entailment filter to generate one or more filtered related items.

10. The device of claim 1, wherein the dependency network encoder is further configured to:
    provide the context to a dependency parser to generate a dependency parsing graph;
    generate node embeddings based at least in part on elements of the context corresponding to nodes of the dependency parsing graph; and
    provide an input embedding to one or more encoding layers to generate the semantic-based representation of the context, the input embedding based at least in part on the node embeddings.

11. The device of claim 10, wherein the input embedding indicates, for each node embedding of the node embeddings, parts of speech of one or more elements of the context that correspond to the node embedding.

12. The device of claim 10, wherein the input embedding indicates, for each node embedding of the node embeddings, whether one or more elements of the context that correspond to the node embedding are associated with the one or more items of interest.

13. The device of claim 10, wherein an encoding layer of the one or more encoding layers includes an attention layer and a feed forward layer, wherein the attention layer includes a multi-head attention, wherein an input of the attention layer is based on the input embedding, and wherein the semantic-based representation of the context is based on an output of the attention layer.

14. The device of claim 10, wherein the dependency network encoder further comprises a prediction layer, wherein an input of the prediction layer is based on the semantic-based representation of the context, and wherein an output of the prediction layer indicates one or more elements of the context that are predicted to be related to the one or more items of interest.

15. The device of claim 10, wherein the dependency parser is configured to generate the dependency parsing graph based at least in part on a previous context.

16. The device of claim 10, wherein the one or more encoding layers are configured to generate the semantic-based representation of the context based at least in part on a second input embedding, wherein the second input embedding is associated with a second dependency parsing graph that is based on a previous context.

17. The device of claim 10, wherein the one or more encoding layers are configured to generate the semantic-based representation of the context based at least in part on a second semantic-based representation of a previous context.

18. The device of claim 1, wherein the data dependent encoder is configured to:
generate an input embedding based on elements of the context; and
provide the input embedding to one or more encoding layers to generate the context-based representation.

19. The device of claim 18, wherein an encoding layer of the one or more encoding layers includes an attention layer and a feed forward layer, wherein the attention layer includes a multi-head attention, wherein an input of the attention layer is based on the input embedding, and wherein the context-based representation is based on an output of the attention layer.

20. The device of claim 18, wherein the one or more encoding layers are configured to generate the context-based representation based at least in part on a second input embedding associated with a previous context.

21. The device of claim 18, wherein the one or more encoding layers are configured to generate the context-based representation based at least in part on a second context-based representation of a previous context.

22. A method comprising:
providing, at a device, context and one or more items of interest corresponding to the context to a dependency network encoder to generate a semantic-based representation of the context;
providing, at the device, the context to a data dependent encoder to generate a context-based representation; and
combining, at the device, the semantic-based representation and the context-based representation to generate a semantically-augmented representation of the context.

23. The method of claim 22, further comprising:
receiving, at the device, sensor data from one or more sensors; and
generating the context based on the sensor data.

24. The method of claim 22, further comprising:
providing, at the device, the semantically-augmented representation of the context to a generative decoder to generate one or more predicted questions for an answer that is indicated by the context, wherein the one or more items include the answer; and
providing, at the device, the one or more predicted questions to an entailment filter to generate one or more filtered predicted questions, wherein the one or more filtered predicted questions are included in a training set to train a question answer network.

25. A non-transitory computer-readable medium storing instructions that, when executed by one or more processors, cause the one or more processors to:
provide context and one or more items of interest corresponding to the context to a dependency network encoder to generate a semantic-based representation of the context;
provide the context to a data dependent encoder to generate a context-based representation; and
combine the semantic-based representation and the context-based representation to generate a semantically-augmented representation of the context.

26. The non-transitory computer-readable medium of claim 25, wherein the instructions, when executed by the one or more processors, further cause the one or more processors to provide the semantically-augmented representation of the context to a generative decoder to generate one or more related items.

27. The non-transitory computer-readable medium of claim 26, wherein the one or more items of interest include an answer indicated by the context, and wherein the one or more related items include a predicted question for the answer.

28. The non-transitory computer-readable medium of claim 26, wherein the one or more items of interest include a question related to the context, and wherein the one or more related items include a predicted answer to the question.

29. An apparatus comprising:
means for providing context and one or more items of interest corresponding to the context to a dependency network encoder to generate a semantic-based representation of the context;
means for providing the context to a data dependent encoder to generate a context-based representation; and
means for combining the semantic-based representation and the context-based representation to generate a semantically-augmented representation of the context.

30. The apparatus of claim 29, wherein the means for providing the context and the one or more items of interest to the dependency network encoder, the means for providing the context to the data dependent encoder, and the means for combining are integrated into at least one of a voice-activated device, a wireless speaker and voice activated device, a portable electronic device, a car, a vehicle, a computing device, a communication device, an internet-of-things (IoT) device, a virtual reality (VR) device, a mixed reality (MR) device, an augmented reality (AR) device, or a combination thereof.

* * * * *